US00RE50411E

(19) United States
(12) Reissued Patent
Seo et al.

(10) Patent Number: US RE50,411 E
(45) Date of Reissued Patent: Apr. 29, 2025

(54) METHOD AND DEVICES FOR SELECTING TRANSMISSION RESOURCE IN WIRELESS ACCESS SYSTEM SUPPORTING NON-LICENSED BAND

(71) Applicant: LG ELECTRONICS INC., Seoul (KR)

(72) Inventors: Hanbyul Seo, Seoul (KR); Yunjung Yi, Seoul (KR); Suckchel Yang, Seoul (KR)

(73) Assignee: LG ELECTRONICS INC., Seoul (KR)

(21) Appl. No.: 17/561,217

(22) Filed: Dec. 23, 2021

Related U.S. Patent Documents

Reissue of:
(64) Patent No.: 10,517,070
Issued: Dec. 24, 2019
Appl. No.: 15/517,902
PCT Filed: Nov. 2, 2015
PCT No.: PCT/KR2015/011632
§ 371 (c)(1),
(2) Date: Apr. 7, 2017
PCT Pub. No.: WO2016/068667
PCT Pub. Date: May 6, 2016

U.S. Applications:
(60) Provisional application No. 62/073,035, filed on Oct. 31, 2014.

(51) Int. Cl.
*H04W 4/00* (2018.01)
*H04J 11/00* (2006.01)
(Continued)

(52) U.S. Cl.
CPC ..... *H04W 72/02* (2013.01); *H04L 1/0061* (2013.01); *H04L 1/1812* (2013.01);
(Continued)

(58) Field of Classification Search
CPC ..... H04W 72/046; H04W 74/006; H04W 72/042; H04W 76/11; H04W 76/28;
(Continued)

(56) References Cited

U.S. PATENT DOCUMENTS 8,804,638 B2 * 8/2014 Liu ..... H04L 1/1861 370/329
2008/0130519 A1 * 6/2008 Bahl ..... H04W 16/14 370/254

(Continued)

OTHER PUBLICATIONS

U.S. Appl. No. 15/517,902, Office Action dated Feb. 19, 2019, 14 pages.

(Continued)

*Primary Examiner* — Ovidio Escalante
(74) *Attorney, Agent, or Firm* — LEE, HONG, DEGERMAN, KANG & WAIMEY

(57) ABSTRACT

The present invention relates to a wireless access system supporting a non-licensed band and provides a method for selecting an uplink transmission resource and devices for same. A method for selecting the uplink transmission resource in the wireless access system, according to one embodiment of the present invention, may comprise the steps of: receiving, from an eNB, information related to a resource selection area; selecting an uplink transmission resource in a cell in which the non-licensed band is formed for the resource selection area according to the information related to the resource selection area; and transmitting a signal through the selected uplink transmission resource, wherein the uplink transmission resource in the resource selection area may be selected without receiving an uplink grant from the eNB.

11 Claims, 21 Drawing Sheets

(51) Int. Cl.

| | |
|---|---|
| ***H04J 13/00*** | (2011.01) |
| ***H04L 1/00*** | (2006.01) |
| ***H04L 1/18*** | (2023.01) |
| ***H04L 1/1812*** | (2023.01) |
| ***H04L 5/00*** | (2006.01) |
| ***H04L 25/02*** | (2006.01) |
| ***H04W 16/14*** | (2009.01) |
| ***H04W 72/02*** | (2009.01) |
| ***H04W 72/04*** | (2023.01) |
| ***H04W 72/044*** | (2023.01) |
| ***H04W 72/0446*** | (2023.01) |
| ***H04W 72/14*** | (2009.01) |
| ***H04W 72/23*** | (2023.01) |
| ***H04W 74/00*** | (2009.01) |
| ***H04W 74/08*** | (2024.01) |
| ***H04W 76/11*** | (2018.01) |
| ***H04W 76/28*** | (2018.01) |
| *H04W 74/0808* | (2024.01) |

(52) U.S. Cl.

CPC ..... *H04L 5/0048* (2013.01); *H04L 5/0055* (2013.01); *H04L 25/0224* (2013.01); *H04W 16/14* (2013.01); *H04W 72/0446* (2013.01); *H04W 72/046* (2013.01); *H04W 72/23* (2023.01); *H04W 74/006* (2013.01); *H04W 76/11* (2018.02); *H04W 76/28* (2018.02); *H04J 11/0069* (2013.01); *H04J 13/0059* (2013.01); *H04L 1/0026* (2013.01); *H04L 5/001* (2013.01); *H04W 74/0808* (2013.01)

(58) Field of Classification Search

CPC . H04W 72/0446; H04W 72/02; H04W 16/14; H04W 72/14; H04W 74/0808; H04L 5/0091; H04L 1/0061; H04L 5/0055; H04L 1/1812; H04L 25/0224; H04L 27/0006; H04L 5/0048; H04L 5/001; H04L 1/0026; H04J 13/0059; H04J 11/0069

See application file for complete search history.

(56) References Cited

U.S. PATENT DOCUMENTS

2009/0257413 A1* 10/2009 Smith ..... H04W 74/0816 370/338
2014/0192767 A1* 7/2014 Au ..... H04W 72/0413 370/330
2014/0254544 A1* 9/2014 Kar Kin Au ..... H04L 5/0033 370/330
2014/0287769 A1* 9/2014 Taori ..... H04W 74/004 455/450
2014/0328329 A1* 11/2014 Novlan ..... H04W 56/0015 370/336
2015/0085797 A1* 3/2015 Ji ..... H04J 3/16 370/329
2015/0215903 A1* 7/2015 Zhao ..... H04W 72/02 370/329
2016/0043843 A1* 2/2016 Liu ..... H04L 5/001 370/329
2018/0184459 A1* 6/2018 Kim ..... H04L 5/00
2018/0248645 A1* 8/2018 Bayesteh ..... H04L 1/0001
2019/0098605 A1 3/2019 Seo et al.
2020/0077346 A1* 3/2020 Kwak ..... H04W 52/242

OTHER PUBLICATIONS

U.S. Appl. No. 15/517,902, Notice of Allowance dated Aug. 6, 2019, 8 pages.
PCT International Application No. PCT/KR2015/011632, Written Opinion of the International Searching Authority dated Feb. 16, 2016, 18 pages.
LG Electronics, "Candidate solutions for LAA operation", R1-144042, 3GPP TSG RAN WG1 Meeting #78bis, Oct. 2014, 6 pages.
ZTE, "Required functionalities and design targets of LAA", R1-143827, 3GPP TSG RAN WG1 Meeting #78bis, Oct. 2014, 7 pages.
Samsung, "Views on required functionalities and design targets for LAA", R1-143878, 3GPP TSG RAN WG1 Meeting #78bis, Oct. 2014, 3 pages.
NTT Docomo, "Inter-operator and Inter-RAT co-existence techniques for LAA using LTE", R1-144150, 3GPP TSG RAN WG1 Meeting #78bis, Oct. 2014, 6 pages.

* cited by examiner (a)

(b)

(a)

(b)

METHOD AND DEVICES FOR SELECTING TRANSMISSION RESOURCE IN WIRELESS ACCESS SYSTEM SUPPORTING NON-LICENSED BAND

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

CROSS-REFERENCE TO RELATED APPLICATIONS

This application *is a reissue application of U.S. Pat. No. 10,517,070, issued on Dec. 24, 2019, from U.S. patent application Ser. No. 15/517,902, filed on Apr. 7, 2017, which* is the National Stage filing under 35 U.S.C. 371 of International Application No. PCT/KR2015/011632, filed on Nov. 2, 2015, which claims the benefit of U.S. Provisional Application No. 62/073,035, filed on Oct. 31, 2014, the contents of which are all hereby incorporated by reference herein in their entirety.

TECHNICAL FIELD

The present invention relates to a method of selecting a transmission resource in a wireless access system supporting an unlicensed band and an apparatus therefor.

BACKGROUND ART

Wireless access systems have been widely deployed to provide various types of communication services such as voice or data. In general, a wireless access system is a multiple access system that supports communication of multiple users by sharing available system resources (a bandwidth, transmission power, etc.) among them. For example, multiple access systems include a Code Division Multiple Access (CDMA) system, a Frequency Division Multiple Access (FDMA) system, a Time Division Multiple Access (TDMA) system, an Orthogonal Frequency Division Multiple Access (OFDMA) system, and a Single Carrier Frequency Division Multiple Access (SC-FDMA) system.

DISCLOSURE OF THE INVENTION

Technical Problem

Wireless access systems have been widely deployed to provide various types of communication services such as voice or data. In general, a wireless access system is a multiple access system that supports communication of multiple users by sharing available system resources (a bandwidth, transmission power, etc.) among them. For example, multiple access systems include a Code Division Multiple Access (CDMA) system, a Frequency Division Multiple Access (FDMA) system, a Time Division Multiple Access (TDMA) system, an Orthogonal Frequency Division Multiple Access (OFDMA) system, and a Single Carrier Frequency Division Multiple Access (SC-FDMA) system.

Technical Solution

The present invention relates to a wireless access system supporting an unlicensed, more particularly, to a method of selecting a transmission resource in a wireless access system supporting an unlicensed band and an apparatus therefor.

To achieve these and other advantages and in accordance with the purpose of the present invention, as embodied and broadly described, according to one embodiment, a method of selecting an uplink transmission resource, which is selected by a user equipment (UE) in a wireless access system supporting an unlicensed band, includes the steps of receiving information on a resource selection area from an eNB, selecting an uplink transmission resource in a cell in which the unlicensed band is configured based on the resource selection area corresponding to the information on the resource selection area, and transmitting a signal via the selected uplink transmission resource. In this case, the uplink transmission resource can be selected from the resource selection area without receiving an uplink grant from the eNB.

To further achieve these and other advantages and in accordance with the purpose of the present invention, according to a different embodiment, an apparatus selecting an uplink transmission resource in a wireless access system supporting an unlicensed band includes a transmitter, a receiver, and a processor configured to support selection of the uplink transmission resource, the processor configured to control the receiver to receive information on a resource section area from an eNB and select an uplink transmission resource in a cell in which the unlicensed band is configured based on the resource selection area corresponding to the information on the resource selection area, the processor configured to control the transmitter to transmit a signal via the selected uplink transmission resource. In this case, the uplink transmission resource can be selected from the resource selection area without receiving an uplink grant from the eNB.

In the embodiments of the present invention, items described in the following can be commonly applied.

The method can further include the step of receiving reservation resource configuration information for downlink transmission on the unlicensed band from the eNB. In this case, the resource selection area can be determined based on the reservation resource configuration information.

More specifically, the resource selection area may correspond to a prescribed resource within a reservation resource period according to reservation resource configuration information.

Or, the resource selection area may correspond to a prescribed resource other than a reservation resource period according to reservation resource configuration information. In this case, the resource selection area may correspond to a time period interlocked with the reservation resource period. In this case, the signal can be transmitted according to synchronization obtained from the eNB and the signal can be transmitted based on a parameter transmitted from the eNB.

Moreover, the method can further include the steps of performing carrier sensing on the cell in which the unlicensed band is configured in the resource selection area, and if a specific resource is in an idle state in the resource selection area, selecting the specific resource as an uplink transmission resource.

The method can further include the step of repeating carrier sensing for selecting the resource as many as a first backoff counter. In this case, if an idle state is repeated as many as the first backoff counter, the specific resource can be determined as in an idle state.

The reservation resource can be configured based on carrier sensing of the eNB.

Preferably, the carrier sensing for the reservation resource can be repeated as many as a second backoff counter. In this case, the second backoff counter may have a value smaller than a value of the first backoff counter.

Meanwhile, the method can further include the step of autonomously generating an uplink grant for selecting the resource.

Effects obtainable from the present invention are non-limited by the above mentioned effect. And, other unmentioned effects can be clearly understood from the following description by those having ordinary skill in the technical field to which the present invention pertains. That is, unintended effects of the present invention may also be derived by those skilled in the art from the embodiments of the present invention.

Advantageous Effects

According to embodiments of the present invention, it is able to efficiently transmit and receive data in a wireless access system supporting an unlicensed band. And, it is able to provide various methods for selecting an uplink resource in a wireless access system supporting an unlicensed band and an apparatus therefor.

Effects obtainable from the present invention are non-limited by the above mentioned effect. And, other unmentioned effects can be clearly understood from the following description by those having ordinary skill in the technical field to which the present invention pertains. That is, unintended effects of the present invention may also be derived by those skilled in the art from the embodiments of the present invention.

DESCRIPTION OF DRAWINGS

The accompanying drawings, which are included to provide a further understanding of the disclosure, illustrate embodiments of the disclosure and together with the description serve to explain the principle of the disclosure. In the drawings.

BEST MODE

Mode for Invention

Figure 1:
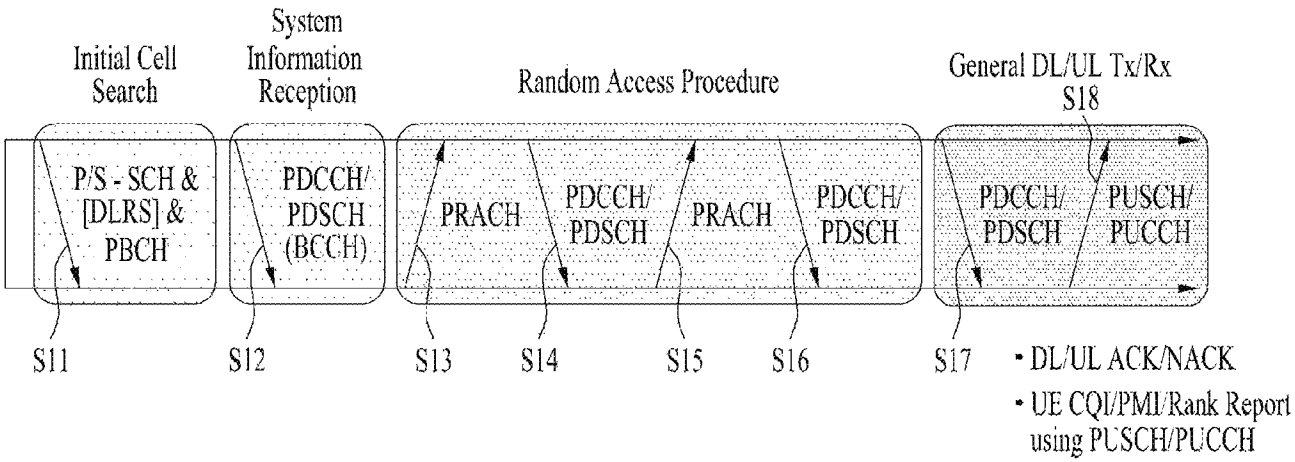
FIG. 1 is a view illustrating physical channels and a signal transmission method using the physical channels.

Embodiments of the present disclosure as described below in detail relate to a wireless access system supporting an unlicensed band, and provide a method for configuring a Transmission Opportunity Period (TxOP) and apparatuses supporting the same.

The embodiments of the present disclosure described below are combinations of elements and features of the present disclosure in specific forms. The elements or features may be considered selective unless otherwise mentioned. Each element or feature may be practiced without being combined with other elements or features. Further, an embodiment of the present disclosure may be constructed by combining parts of the elements and/or features. Operation orders described in embodiments of the present disclosure may be rearranged. Some constructions or elements of any one embodiment may be included in another embodiment and may be replaced with corresponding constructions or features of another embodiment.

In the description of the attached drawings, a detailed description of known procedures or steps of the present disclosure will be avoided lest it should obscure the subject matter of the present disclosure. In addition, procedures or steps that could be understood to those skilled in the art will not be described either.

Throughout the specification, when a certain portion "includes" or "comprises" a certain component, this indicates that other components are not excluded and may be further included unless otherwise noted. The terms "unit", "-or/er" and "module" described in the specification indicate a unit for processing at least one function or operation, which may be implemented by hardware, software or a combination thereof. In addition, the terms "a or an", "one", "the" etc. may include a singular representation and a plural representation in the context of the present disclosure (more particularly, in the context of the following claims) unless indicated otherwise in the specification or unless context clearly indicates otherwise.

In the embodiments of the present disclosure, a description is mainly made of a data transmission and reception relationship between a Base Station (BS) and a User Equipment (UE). A BS refers to a terminal node of a network, which directly communicates with a UE. A specific operation described as being performed by the BS may be performed by an upper node of the BS.

Namely, it is apparent that, in a network comprised of a plurality of network nodes including a BS, various operations performed for communication with a UE may be performed by the BS, or network nodes other than the BS. The term 'BS' may be replaced with a fixed station, a Node B, an evolved Node B (eNode B or eNB), an Advanced Base Station (ABS), an access point, etc.

In the embodiments of the present disclosure, the term terminal may be replaced with a UE, a Mobile Station (MS), a Subscriber Station (SS), a Mobile Subscriber Station (MSS), a mobile terminal, an Advanced Mobile Station (AMS), etc.

A transmission end is a fixed and/or mobile node that provides a data service or a voice service and a reception end is a fixed and/or mobile node that receives a data service or a voice service. Therefore, a UE may serve as a transmission end and a BS may serve as a reception end, on an UpLink (UL). Likewise, the UE may serve as a reception end and the BS may serve as a transmission end, on a DownLink (DL).

The embodiments of the present disclosure may be supported by standard specifications disclosed for at least one of wireless access systems including an Institute of Electrical and Electronics Engineers (IEEE) 802.xx system, a 3rd Generation Partnership Project (3GPP) system, a 3GPP Long Term Evolution (LTE) system, and a 3GPP2 system. In particular, the embodiments of the present disclosure may be supported by the standard specifications, 3GPP TS 36.211, 3GPP TS 36.212, 3GPP TS 36.213, 3GPP TS 36.321 and 3GPP TS 36.331. That is, the steps or parts, which are not described to clearly reveal the technical idea of the present disclosure, in the embodiments of the present disclosure may be explained by the above standard specifications. All terms used in the embodiments of the present disclosure may be explained by the standard specifications.

Reference will now be made in detail to the embodiments of the present disclosure with reference to the accompanying drawings. The detailed description, which will be given below with reference to the accompanying drawings, is intended to explain exemplary embodiments of the present disclosure, rather than to show the only embodiments that can be implemented according to the disclosure.

The following detailed description includes specific terms in order to provide a thorough understanding of the present disclosure. However, it will be apparent to those skilled in the art that the specific terms may be replaced with other terms without departing the technical spirit and scope of the present disclosure.

For example, the term, TxOP may be used interchangeably with transmission period or Reserved Resource Period (RRP) in the same sense. Further, a Listen-Before-Talk (LBT) procedure may be performed for the same purpose as a carrier sensing procedure for determining whether a channel state is idle or busy.

Hereinafter, 3GPP LTE/LTE-A systems are explained, which are examples of wireless access systems.

The embodiments of the present disclosure can be applied to various wireless access systems such as Code Division Multiple Access (CDMA), Frequency Division Multiple Access (FDMA), Time Division Multiple Access (TDMA), Orthogonal Frequency Division Multiple Access (OFDMA), Single Carrier Frequency Division Multiple Access (SC-FDMA), etc.

CDMA may be implemented as a radio technology such as Universal Terrestrial Radio Access (UTRA) or CDMA2000. TDMA may be implemented as a radio technology such as Global System for Mobile communications (GSM)/General packet Radio Service (GPRS)/Enhanced Data Rates for GSM Evolution (EDGE). OFDMA may be implemented as a radio technology such as IEEE 802.11 (Wi-Fi), IEEE 802.16 (WiMAX), IEEE 802.20, Evolved UTRA (E-UTRA), etc.

UTRA is a part of Universal Mobile Telecommunications System (UMTS). 3GPP LTE is a part of Evolved UMTS (E-UMTS) using E-UTRA, adopting OFDMA for DL and SC-FDMA for UL. LTE-Advanced (LTE-A) is an evolution of 3GPP LTE. While the embodiments of the present disclosure are described in the context of a 3GPP LTE/LTE-A system in order to clarify the technical features of the present disclosure, the present disclosure is also applicable to an IEEE 802.16e/m system, etc.

1. 3GPP LTE/LTE-A System

In a wireless access system, a UE receives information from an eNB on a DL and transmits information to the eNB on a UL. The information transmitted and received between the UE and the eNB includes general data information and various types of control information. There are many physical channels according to the types/usages of information transmitted and received between the eNB and the UE.

1.1 System Overview

FIG. 1 illustrates physical channels and a general signal transmission method using the physical channels, which may be used in embodiments of the present disclosure.

When a UE is powered on or enters a new cell, the UE performs initial cell search (S11). The initial cell search involves acquisition of synchronization to an eNB. Specifically, the UE synchronizes its timing to the eNB and acquires information such as a cell Identifier (ID) by receiving a Primary Synchronization Channel (P-SCH) and a Secondary Synchronization Channel (S-SCH) from the eNB.

Then the UE may acquire information broadcast in the cell by receiving a Physical Broadcast Channel (PBCH) from the eNB.

During the initial cell search, the UE may monitor a DL channel state by receiving a Downlink Reference Signal (DL RS).

After the initial cell search, the UE may acquire more detailed system information by receiving a Physical Downlink Control Channel (PDCCH) and receiving a Physical Downlink Shared Channel (PDSCH) based on information of the PDCCH (S12).

To complete connection to the eNB, the UE may perform a random access procedure with the eNB (S13 to S16). In the random access procedure, the UE may transmit a preamble on a Physical Random Access Channel (PRACH) (S13) and may receive a PDCCH and a PDSCH associated with the PDCCH (S14). In the case of contention-based random access, the UE may additionally perform a contention resolution procedure including transmission of an additional PRACH (S15) and reception of a PDCCH signal and a PDSCH signal corresponding to the PDCCH signal (S16).

After the above procedure, the UE may receive a PDCCH and/or a PDSCH from the eNB (S17) and transmit a Physical Uplink Shared Channel (PUSCH) and/or a Physical Uplink Control Channel (PUCCH) to the eNB (S18), in a general UL/DL signal transmission procedure.

Control information that the UE transmits to the eNB is generically called Uplink Control Information (UCI). The UCI includes a Hybrid Automatic Repeat and reQuest Acknowledgement/Negative Acknowledgement (HARQ-ACK/NACK), a Scheduling Request (SR), a Channel Quality Indicator (CQI), a Precoding Matrix Index (PMI), a Rank Indicator (RI), etc.

In the LTE system, UCI is generally transmitted on a PUCCH periodically. However, if control information and traffic data should be transmitted simultaneously, the control information and traffic data may be transmitted on a PUSCH. In addition, the UCI may be transmitted aperiodically on the PUSCH, upon receipt of a request/command from a network.

Figure 2:
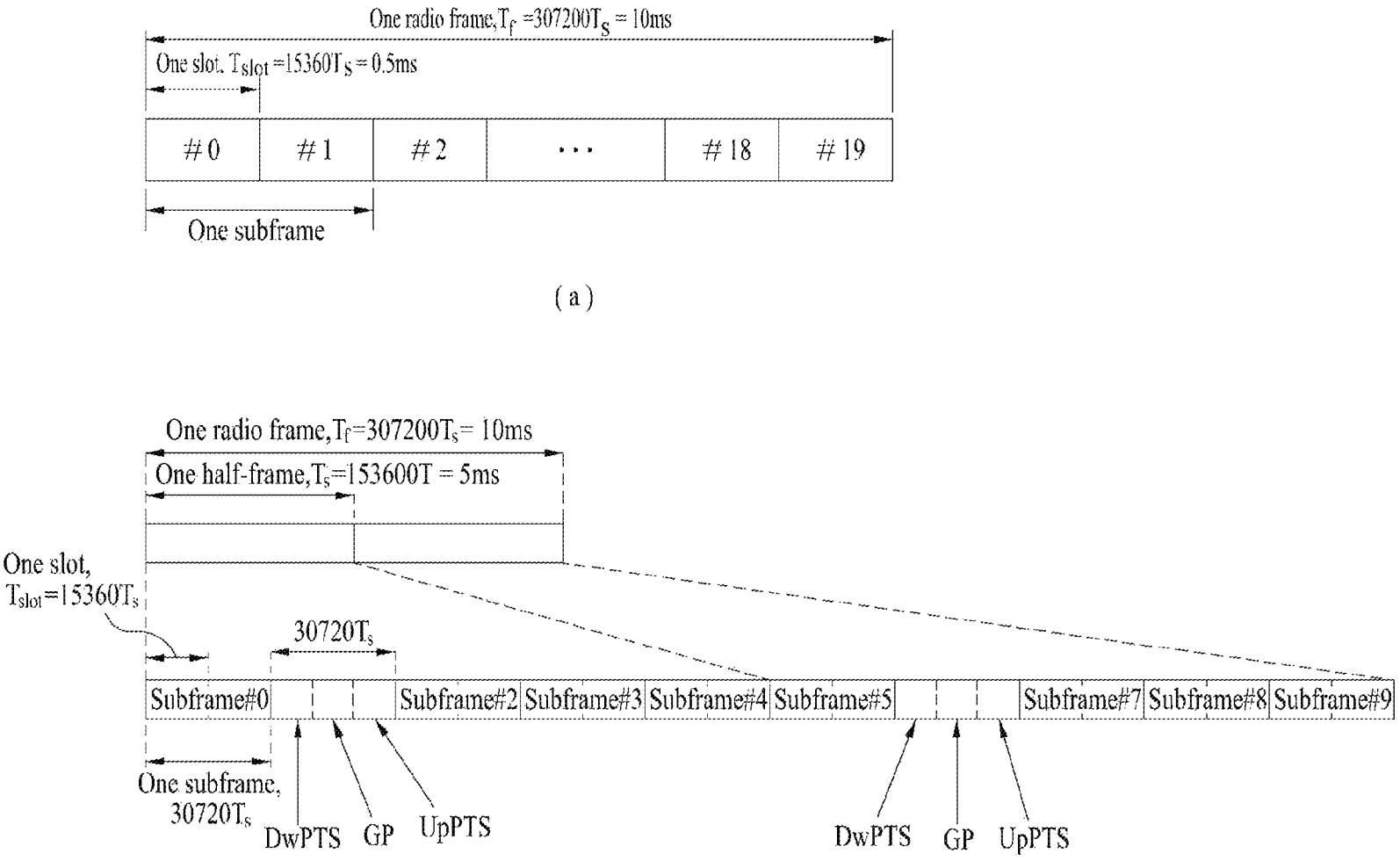
FIG. 2 is a view illustrating exemplary radio frame structures.

FIG. 2 illustrates exemplary radio frame structures used in embodiments of the present disclosure.

FIG. 2(a) illustrates frame structure type 1. Frame structure type 1 is applicable to both a full Frequency Division Duplex (FDD) system and a half FDD system.

One radio frame is 10 ms (Tf=307200·Ts) long, including equal-sized 20 slots indexed from 0 to 19. Each slot is 0.5 ms (Tslot=15360·Ts) long. One subframe includes two successive slots. An ith subframe includes 2ith and (2i+1)th slots. That is, a radio frame includes 10 subframes. A time required for transmitting one subframe is defined as a Transmission Time Interval (TTI). Ts is a sampling time given as Ts=1/(15 kHz×2048)=3.2552×10−8 (about 33 ns). One slot includes a plurality of Orthogonal Frequency Division Multiplexing (OFDM) symbols or SC-FDMA symbols in the time domain by a plurality of Resource Blocks (RBs) in the frequency domain.

A slot includes a plurality of OFDM symbols in the time domain. Since OFDMA is adopted for DL in the 3GPP LTE system, one OFDM symbol represents one symbol period. An OFDM symbol may be called an SC-FDMA symbol or symbol period. An RB is a resource allocation unit including a plurality of contiguous subcarriers in one slot.

In a full FDD system, each of 10 subframes may be used simultaneously for DL transmission and UL transmission during a 10-ms duration. The DL transmission and the UL transmission are distinguished by frequency. On the other hand, a UE cannot perform transmission and reception simultaneously in a half FDD system.

The above radio frame structure is purely exemplary. Thus, the number of subframes in a radio frame, the number of slots in a subframe, and the number of OFDM symbols in a slot may be changed.

FIG. 2(b) illustrates frame structure type 2. Frame structure type 2 is applied to a Time Division Duplex (TDD) system. One radio frame is 10 ms (Tf=307200·Ts) long, including two half-frames each having a length of 5 ms (=153600·Ts) long. Each half-frame includes five subframes each being 1 ms (=30720·Ts) long. An ith subframe includes 2ith and (2i+1)th slots each having a length of 0.5 ms (Tslot=15360·Ts). Ts is a sampling time given as Ts=1/(15 kHz×2048)=3.2552×10-8 (about 33 ns).

A type-2 frame includes a special subframe having three fields, Downlink Pilot Time Slot (DwPTS), Guard Period (GP), and Uplink Pilot Time Slot (UpPTS). The DwPTS is used for initial cell search, synchronization, or channel estimation at a UE, and the UpPTS is used for channel estimation and UL transmission synchronization with a UE at an eNB. The GP is used to cancel UL interference between a UL and a DL, caused by the multi-path delay of a DL signal.

[Table 1] below lists special subframe configurations (DwPTS/GP/UpPTS lengths).

TABLE 1

| | Normal cyclic prefix in downlink | | | Extended cyclic prefix in downlink | | |
|---|---|---|---|---|---|---|
| | | UpPTS | | | UpPTS | |
| Special subframe configuration | DwPTS | Normal cyclic prefix in uplink | Extended cyclic prefix in uplink | DwPTS | Normal cyclic prefix in uplink | Extended cyclic prefix in uplink |
| 0 | $6592 \cdot T_s$ | $2192 \cdot T_s$ | $2560 \cdot T_s$ | $7680 \cdot T_s$ | $2192 \cdot T_s$ | $2560 \cdot T_s$ |
| 1 | $19760 \cdot T_s$ | | | $20480 \cdot T_s$ | | |
| 2 | $21952 \cdot T_s$ | | | $23040 \cdot T_s$ | | |
| 3 | $24144 \cdot T_s$ | | | $25600 \cdot T_s$ | | |
| 4 | $26336 \cdot T_s$ | | | $7680 \cdot T_s$ | $4384 \cdot T_s$ | $5120 \cdot T_s$ |
| 5 | $6592 \cdot T_s$ | $4384 \cdot T_s$ | $5120 \cdot T_s$ | $20480 \cdot T_s$ | | |
| 6 | $19760 \cdot T_s$ | | | $23040 \cdot T_s$ | | |
| 7 | $21952 \cdot T_s$ | | | — | — | — |
| 8 | $24144 \cdot T_s$ | | | — | — | — |

Figure 3:
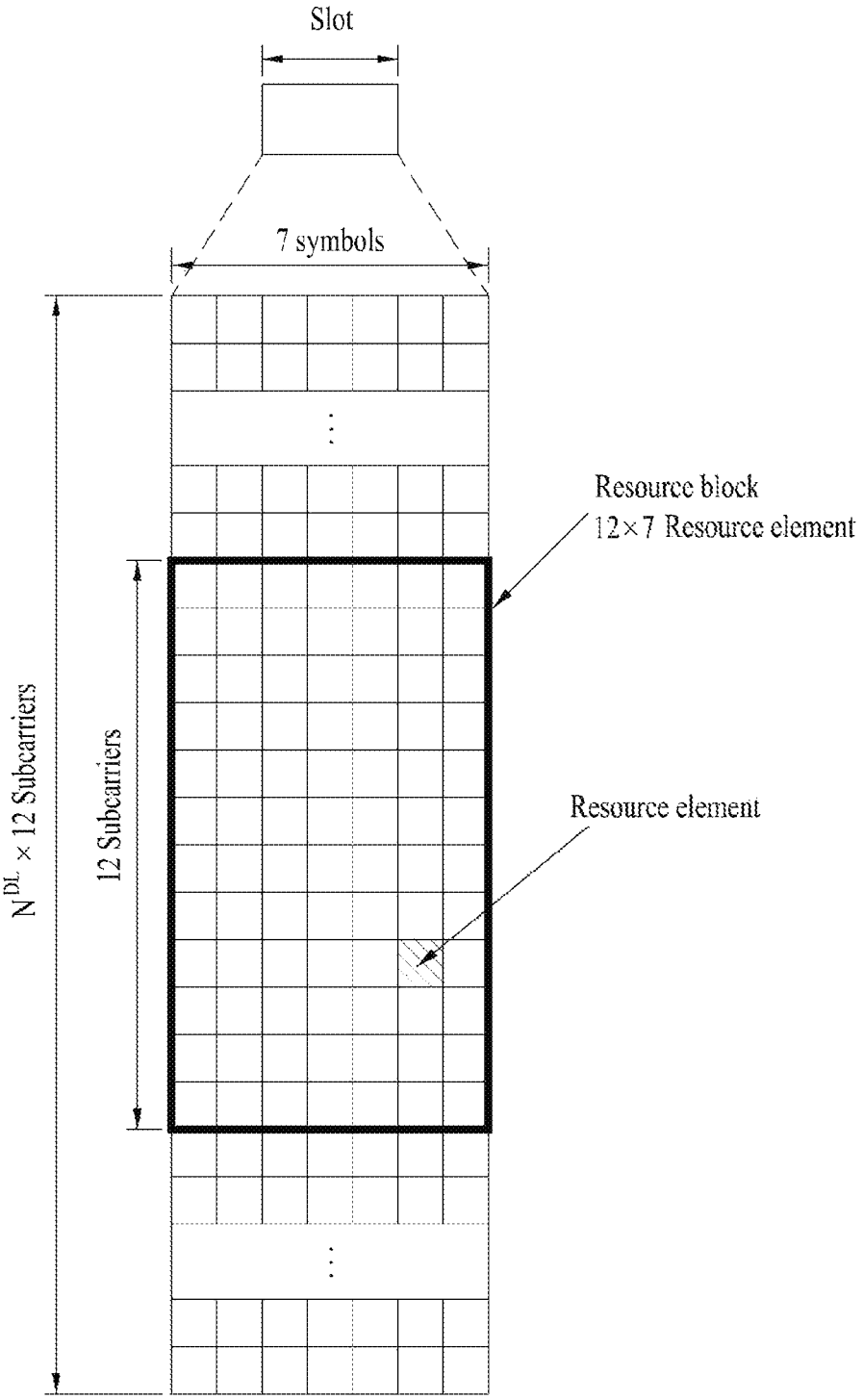
FIG. 3 is a view illustrating an exemplary resource grid for the duration of a downlink slot.

FIG. 3 illustrates an exemplary structure of a DL resource grid for the duration of one DL slot, which may be used in embodiments of the present disclosure.

Referring to FIG. 3, a DL slot includes a plurality of OFDM symbols in the time domain. One DL slot includes 7 OFDM symbols in the time domain and an RB includes 12 subcarriers in the frequency domain, to which the present disclosure is not limited.

Each element of the resource grid is referred to as a Resource Element (RE). An RB includes 12×7 REs. The number of RBs in a DL slot, NDL depends on a DL transmission bandwidth. A UL slot may have the same structure as a DL slot.

Figure 4:
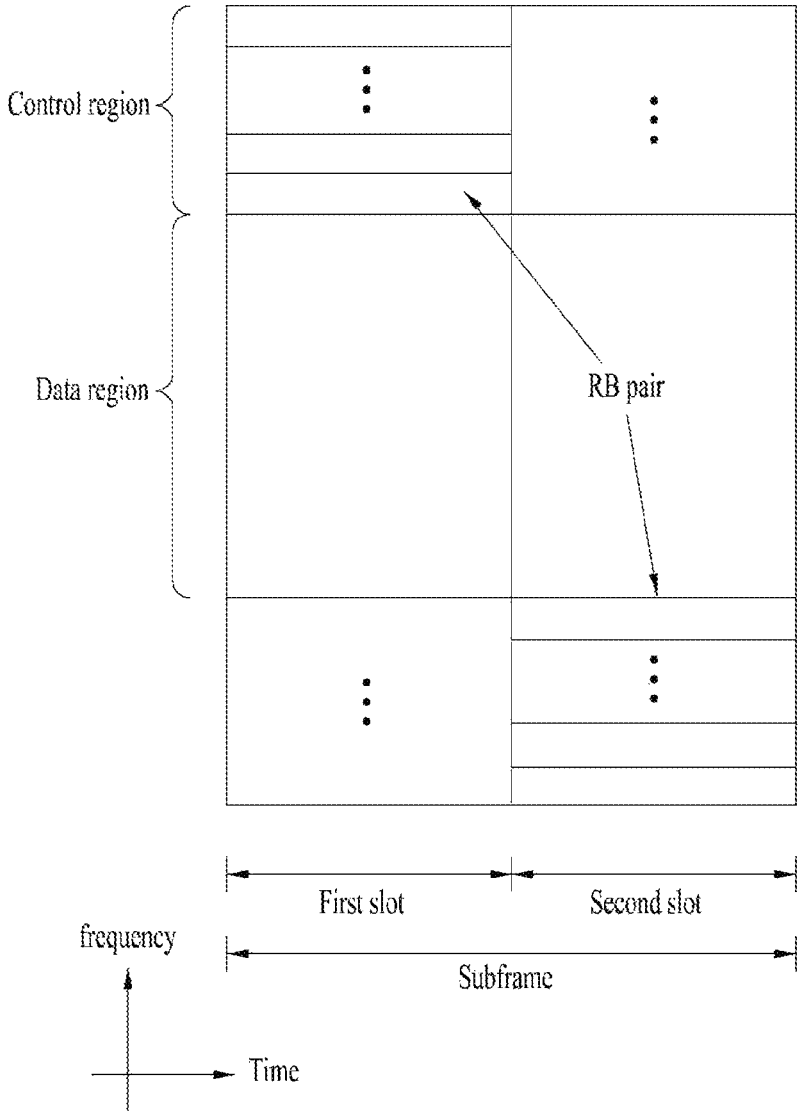
FIG. 4 is a view illustrating an exemplary structure of an uplink subframe.

FIG. 4 illustrates a structure of a UL subframe which may be used in embodiments of the present disclosure.

Referring to FIG. 4, a UL subframe may be divided into a control region and a data region in the frequency domain. A PUCCH carrying UCI is allocated to the control region and a PUSCH carrying user data is allocated to the data region. To maintain a single carrier property, a UE does not transmit a PUCCH and a PUSCH simultaneously. A pair of RBs in a subframe are allocated to a PUCCH for a UE. The RBs of the RB pair occupy different subcarriers in two slots. Thus it is said that the RB pair frequency-hops over a slot boundary.

Figure 5:
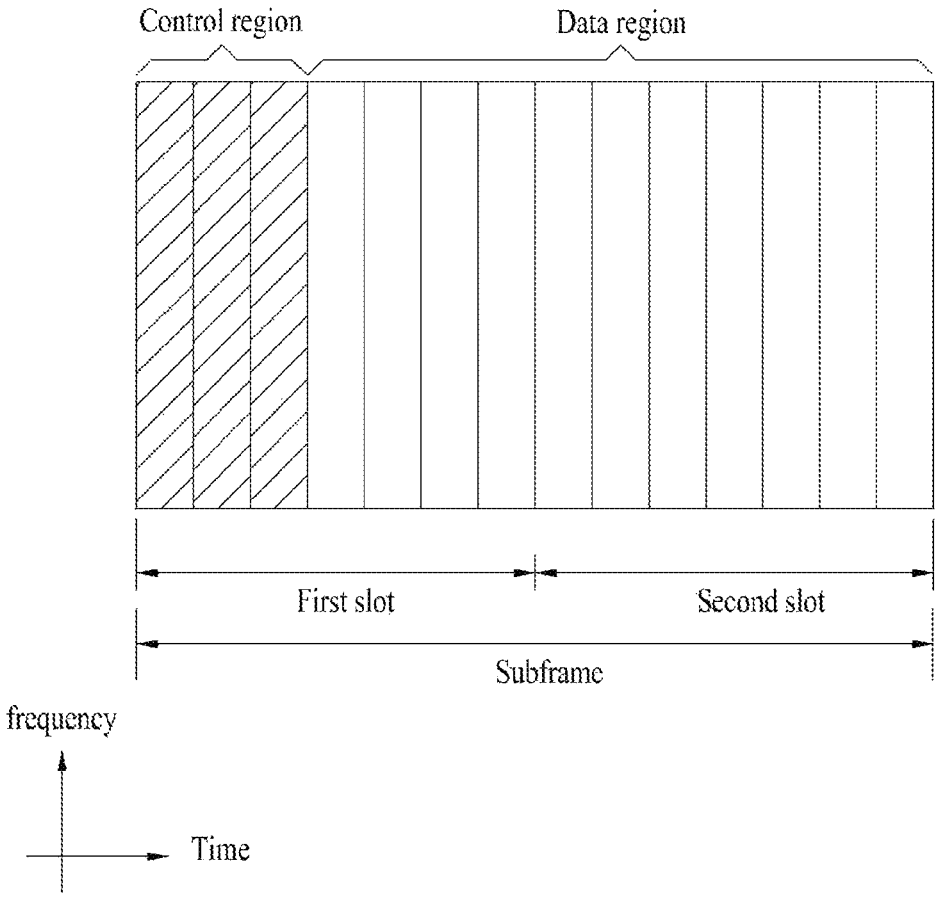
FIG. 5 is a view illustrating an exemplary structure of a downlink subframe.

FIG. 5 illustrates a structure of a DL subframe that may be used in embodiments of the present disclosure.

Referring to FIG. 5, up to three OFDM symbols of a DL subframe, starting from OFDM symbol 0 are used as a control region to which control channels are allocated and the other OFDM symbols of the DL subframe are used as a data region to which a PDSCH is allocated. DL control channels defined for the 3GPP LTE system include a Physical Control Format Indicator Channel (PCFICH), a PDCCH, and a Physical Hybrid ARQ Indicator Channel (PHICH).

The PCFICH is transmitted in the first OFDM symbol of a subframe, carrying information about the number of OFDM symbols used for transmission of control channels (i.e. the size of the control region) in the subframe. The PHICH is a response channel to a UL transmission, delivering an HARQ ACK/NACK signal. Control information carried on the PDCCH is called Downlink Control Information (DCI). The DCI transports UL resource assignment information, DL resource assignment information, or UL Transmission (Tx) power control commands for a UE group.

1.2 Physical Downlink Control Channel (PDCCH)

1.2.1 PDCCH Overview

The PDCCH may deliver information about resource allocation and a transport format for a Downlink Shared Channel (DL-SCH) (i.e. a DL grant), information about resource allocation and a transport format for an Uplink Shared Channel (UL-SCH) (i.e. a UL grant), paging information of a Paging Channel (PCH), system information on the DL-SCH, information about resource allocation for a higher-layer control message such as a random access response transmitted on the PDSCH, a set of Tx power control commands for individual UEs of a UE group, Voice Over Internet Protocol (VoIP) activation indication information, etc.

A plurality of PDCCHs may be transmitted in the control region. A UE may monitor a plurality of PDCCHs. A PDCCH is transmitted in an aggregate of one or more consecutive Control Channel Elements (CCEs). A PDCCH made up of one or more consecutive CCEs may be transmitted in the control region after subblock interleaving. A CCE is a logical allocation unit used to provide a PDCCH at a code rate based on the state of a radio channel. A CCE includes a plurality of RE Groups (REGs). The format of a PDCCH and the number of available bits for the PDCCH are determined according to the relationship between the number of CCEs and a code rate provided by the CCEs.

1.2.2 PDCCH Structure

A plurality of PDCCHs for a plurality of UEs may be multiplexed and transmitted in the control region. A PDCCH is made up of an aggregate of one or more consecutive CCEs. A CCE is a unit of 9 REGs each REG including 4 REs. Four Quadrature Phase Shift Keying (QPSK) symbols are mapped to each REG REs occupied by RSs are excluded from REGs. That is, the total number of REGs in an OFDM symbol may be changed depending on the presence or absence of a cell-specific RS. The concept of an REG to which four REs are mapped is also applicable to other DL control channels (e.g. the PCFICH or the PHICH). Let the number of REGs that are not allocated to the PCFICH or the PHICH be denoted by NREG. Then the number of CCEs available to the system is NCCE ($=\lfloor N_{REG}/9 \rfloor$) and the CCEs are indexed from 0 to NCCE−1.

To simplify the decoding process of a UE, a PDCCH format including n CCEs may start with a CCE having an index equal to a multiple of n. That is, given CCE the PDCCH format may start with a CCE satisfying i mod n=0.

The eNB may configure a PDCCH with 1, 2, 4, or 8 CCEs. {1, 2, 4, 8} are called CCE aggregation levels. The number of CCEs used for transmission of a PDCCH is determined according to a channel state by the eNB. For example, one CCE is sufficient for a PDCCH directed to a UE in a good DL channel state (a UE near to the eNB). On the other hand, 8 CCEs may be required for a PDCCH directed to a UE in a poor DL channel state (a UE at a cell edge) in order to ensure sufficient robustness.

[Table 2] below illustrates PDCCH formats. 4 PDCCH formats are supported according to CCE aggregation levels as illustrated in [Table 2].

TABLE 2

| PDCCH format | Number of CCE (n) | Number of REG | Number of PDCCH bits |
|---|---|---|---|
| 0 | 1 | 9 | 72 |
| 1 | 2 | 18 | 144 |
| 2 | 4 | 36 | 288 |
| 3 | 8 | 72 | 576 |

A different CCE aggregation level is allocated to each UE because the format or Modulation and Coding Scheme (MCS) level of control information delivered in a PDCCH for the UE is different. An MCS level defines a code rate used for data coding and a modulation order. An adaptive MCS level is used for link adaptation. In general, three or four MCS levels may be considered for control channels carrying control information.

Regarding the formats of control information, control information transmitted on a PDCCH is called DCI. The configuration of information in PDCCH payload may be changed depending on the DCI format. The PDCCH payload is information bits. [Table 3] lists DCI according to DCI formats.

TABLE 3

| DCI Format | Description |
|---|---|
| Format 0 | Resource grants for PUSCH transmissions (uplink) |
| Format 1 | Resource assignments for single codeword PDSCH transmission (transmission modes 1, 2 and 7) |
| Format 1A | Compact signaling of resource assignments for single codeword PDSCH (all modes) |
| Format 1B | Compact resource assignments for PDSCH using rank-1 closed loop precoding (mode 6) |
| Format 1C | Very compact resource assignments for PDSCH (e.g., paging/broadcast system information) |
| Format 1D | Compact resource assignments for PDSCH using multi-user MIMO(mode 5) |
| Format 2 | Resource assignments for PDSCH for closed loop MIMO operation (mode 4) |
| Format 2A | resource assignments for PDSCH for open loop MIMO operation (mode 3) |
| Format 3/3A | Power control commands for PUCCH and PUSCH with 2-bit/1-bit power adjustment |
| Format 4 | Scheduling of PUSCH in one UL cell with multi-antenna port transmission mode |

Referring to [Table 3], the DCI formats include Format 0 for PUSCH scheduling, Format 1 for single-codeword PDSCH scheduling, Format 1A for compact single-codeword PDSCH scheduling, Format 1C for very compact DL-SCH scheduling, Format 2 for PDSCH scheduling in a closed-loop spatial multiplexing mode, Format 2A for PDSCH scheduling in an open-loop spatial multiplexing mode, and Format 3/3A for transmission of Transmission Power Control (TPC) commands for uplink channels. DCI Format 1A is available for PDSCH scheduling irrespective of the transmission mode of a UE.

The length of PDCCH payload may vary with DCI formats. In addition, the type and length of PDCCH payload may be changed depending on compact or non-compact scheduling or the transmission mode of a UE.

The transmission mode of a UE may be configured for DL data reception on a PDSCH at the UE. For example, DL data carried on a PDSCH includes scheduled data, a paging message, a random access response, broadcast information on a BCCH, etc. for a UE. The DL data of the PDSCH is related to a DCI format signaled through a PDCCH. The transmission mode may be configured semi-statically for the UE by higher-layer signaling (e.g. Radio Resource Control (RRC) signaling). The transmission mode may be classified as single antenna transmission or multi-antenna transmission.

A transmission mode is configured for a UE semi-statically by higher-layer signaling. For example, multi-antenna transmission scheme may include transmit diversity, open-loop or closed-loop spatial multiplexing, Multi-User Multiple Input Multiple Output (MU-MIMO), or beamforming. Transmit diversity increases transmission reliability by transmitting the same data through multiple Tx antennas. Spatial multiplexing enables high-speed data transmission without increasing a system bandwidth by simultaneously transmitting different data through multiple Tx antennas. Beamforming is a technique of increasing the Signal to Interference plus Noise Ratio (SINR) of a signal by weighting multiple antennas according to channel states.

A DCI format for a UE depends on the transmission mode of the UE. The UE has a reference DCI format monitored according to the transmission mode configure for the UE. The following 10 transmission modes are available to UEs:

(1) Transmission mode 1: Single antenna port (port 0);

(2) Transmission mode 2: Transmit diversity;

(3) Transmission mode 3: Open-loop spatial multiplexing when the number of layer is larger than 1 or Transmit diversity when the rank is 1;

(4) Transmission mode 4: Closed-loop spatial multiplexing;

(5) Transmission mode 5: MU-MIMO;

(6) Transmission mode 6: Closed-loop rank-1 precoding;

(7) Transmission mode 7: Precoding supporting a single layer transmission, which is not based on a codebook (Rel-8);

(8) Transmission mode 8: Precoding supporting up to two layers, which are not based on a codebook (Rel-9);

(9) Transmission mode 9: Precoding supporting up to eight layers, which are not based on a codebook (Rel-10); and

(10) Transmission mode 10: Precoding supporting up to eight layers, which are not based on a codebook, used for CoMP (Rel-11).

1.2.3 PDCCH Transmission

The eNB determines a PDCCH format according to DCI that will be transmitted to the UE and adds a Cyclic Redundancy Check (CRC) to the control information. The CRC is masked by a unique Identifier (ID) (e.g. a Radio Network Temporary Identifier (RNTI)) according to the owner or usage of the PDCCH. If the PDCCH is destined for a specific UE, the CRC may be masked by a unique ID (e.g. a cell-RNTI (C-RNTI)) of the UE. If the PDCCH carries a paging message, the CRC of the PDCCH may be masked by a paging indicator ID (e.g. a Paging-RNTI (P-RNTI)). If the PDCCH carries system information, particularly, a System Information Block (SIB), its CRC may be masked by a system information ID (e.g. a System Information RNTI (SI-RNTI)). To indicate that the PDCCH carries a random access response to a random access preamble transmitted by a UE, its CRC may be masked by a Random Access-RNTI (RA-RNTI).

Then, the eNB generates coded data by channel-encoding the CRC-added control information. The channel coding may be performed at a code rate corresponding to an MCS level. The eNB rate-matches the coded data according to a CCE aggregation level allocated to a PDCCH format and generates modulation symbols by modulating the coded data. Herein, a modulation order corresponding to the MCS level may be used for the modulation. The CCE aggregation level for the modulation symbols of a PDCCH may be one of 1, 2, 4, and 8. Subsequently, the eNB maps the modulation symbols to physical REs (i.e. CCE to RE mapping).

1.2.4 Blind Decoding (BD)

A plurality of PDCCHs may be transmitted in a subframe. That is, the control region of a subframe includes a plurality of CCEs, CCE 0 to CCE $N_{CCE,k-1}$. $N_{CCE,k}$ is the total number of CCEs in the control region of a kth subframe. A UE monitors a plurality of PDCCHs in every subframe. This means that the UE attempts to decode each PDCCH according to a monitored PDCCH format.

The eNB does not provide the UE with information about the position of a PDCCH directed to the UE in an allocated control region of a subframe. Without knowledge of the position, CCE aggregation level, or DCI format of its PDCCH, the UE searches for its PDCCH by monitoring a set of PDCCH candidates in the subframe in order to receive a control channel from the eNB. This is called blind decoding. Blind decoding is the process of demasking a CRC part with a UE ID, checking a CRC error, and determining whether a corresponding PDCCH is a control channel directed to a UE by the UE.

The UE monitors a PDCCH in every subframe to receive data transmitted to the UE in an active mode. In a Discontinuous Reception (DRX) mode, the UE wakes up in a monitoring interval of every DRX cycle and monitors a PDCCH in a subframe corresponding to the monitoring interval. The PDCCH-monitored subframe is called a non-DRX subframe.

To receive its PDCCH, the UE should blind-decode all CCEs of the control region of the non-DRX subframe. Without knowledge of a transmitted PDCCH format, the UE should decode all PDCCHs with all possible CCE aggregation levels until the UE succeeds in blind-decoding a PDCCH in every non-DRX subframe. Since the UE does not know the number of CCEs used for its PDCCH, the UE should attempt detection with all possible CCE aggregation levels until the UE succeeds in blind decoding of a PDCCH.

In the LTE system, the concept of Search Space (SS) is defined for blind decoding of a UE. An SS is a set of PDCCH candidates that a UE will monitor. The SS may have a different size for each PDCCH format. There are two types of SSs, Common Search Space (CSS) and UE-specific/Dedicated Search Space (USS).

While all UEs may know the size of a CSS, a USS may be configured for each individual UE. Accordingly, a UE should monitor both a CSS and a USS to decode a PDCCH. As a consequence, the UE performs up to 44 blind decodings in one subframe, except for blind decodings based on different CRC values (e.g., C-RNTI, P-RNTI, SI-RNTI, and RA-RNTI).

In view of the constraints of an SS, the eNB may not secure CCE resources to transmit PDCCHs to all intended UEs in a given subframe. This situation occurs because the remaining resources except for allocated CCEs may not be included in an SS for a specific UE. To minimize this obstacle that may continue in the next subframe, a UE-specific hopping sequence may apply to the starting point of a USS.

[Table 4] illustrates the sizes of CSSs and USSs.

TABLE 4

| PDCCH Format | Number of CCE (n) | Number of candidates in CSS | Number of candidates in USS |
|---|---|---|---|
| 0 | 1 | — | 6 |
| 1 | 2 | — | 6 |
| 2 | 4 | 4 | 2 |
| 3 | 8 | 2 | 2 |

To mitigate the load of the UE caused by the number of blind decoding attempts, the UE does not search for all defined DCI formats simultaneously. Specifically, the UE always searches for DCI Format 0 and DCI Format 1A in a USS. Although DCI Format 0 and DCI Format 1A are of the same size, the UE may distinguish the DCI formats by a flag for format0/format 1a differentiation included in a PDCCH. Other DCI formats than DCI Format 0 and DCI Format 1A, such as DCI Format 1, DCI Format 1B, and DCI Format 2 may be required for the UE.

The UE may search for DCI Format 1A and DCI Format 1C in a CSS. The UE may also be configured to search for DCI Format 3 or 3A in the CSS. Although DCI Format 3 and DCI Format 3A have the same size as DCI Format 0 and DCI Format 1A, the UE may distinguish the DCI formats by a CRC scrambled with an ID other than a UE-specific ID.

An SS $S_k^{(L)}$ is a PDCCH candidate set with a CCE aggregation level $L \in \{1,2,4,8\}$. The CCEs of PDCCH candidate set m in the SS may be determined by the following equation.

$$L \cdot \{(Y_k + m) \bmod \lfloor N_{CCE,k}/L \rfloor\} + i \qquad \text{[Equation 1]}$$

Herein, $M^{(L)}$ is the number of PDCCH candidates with CCE aggregation level L to be monitored in the SS, $m=0, \ldots, M^{(L)}-1$, i is the index of a CCE in each PDCCH candidate, and $i=0, \ldots, L-1$. $k=\lfloor n_s/2 \rfloor$ where $n_s$ is the index of a slot in a radio frame.

As described before, the UE monitors both the USS and the CSS to decode a PDCCH. The CSS supports PDCCHs with CCE aggregation levels {4, 8} and the USS supports PDCCHs with CCE aggregation levels {1, 2, 4, 8}. [Table 5] illustrates PDCCH candidates monitored by a UE.

TABLE 5

| Search space $S_k^{(L)}$ | | | Number of PDCCH |
|---|---|---|---|
| Type | Aggregation level L | Size [in CCEs] | candidates $M^{(L)}$ |
| UE-specific | 1 | 6 | 6 |
| | 2 | 12 | 6 |
| | 4 | 8 | 2 |
| | 8 | 16 | 2 |
| Common | 4 | 16 | 4 |
| | 8 | 16 | 2 |

Referring to [Equation 1], for two aggregation levels, L=4 and L=8, $Y_k$ is set to 0 in the CSS, whereas $Y_k$ is defined by [Equation 2] for aggregation level L in the USS.

$$Y_k = (A \cdot Y_{k-1}) \bmod D \qquad \text{[Equation 2]}$$

Herein, $Y_{-1}=n_{RNTI} \neq 0$, $n_{RNTI}$ indicating an RNTI value. A=39827 and D=65537.

1.3 PUCCH(Physical Uplink Control Channel)

1.3.1 PUCCH Overview

Uplink control information transmitted on PUCCH may include SR (Scheduling Request), HARQ ACK/NACK information, and DL channel measurement information.

The HARQ ACK/NACK information can be generated according to whether a decoding of a DL data packet on PDSCH is succeeded. In a legacy wireless communication system, 1 bit as the ACK/NACK information is transmitted for a DL single codeword transmission and 2 bits as the ACK/NACK information are transmitted for DL 2 codeword transmission.

The channel measurement information indicates feedback information related to a MIMO (Multiple Input Multiple Output) scheme and can include a channel quality indicator (CQI), a precoding matrix index (PMI), and a rank indicator (RI). The aforementioned channel measurement informations may be commonly called a CQI. 20 bits per subframe can be used to transmit the CQI.

PUCCH can be modulated using BPSK (binary phase shift keying) and QPSK (quadrature phase shift keying) scheme. Control information of a plurality of UEs can be transmitted on the PUCCH. In case of performing code division multiplexing (CDM) to distinguish a signal of each of the UEs, constant amplitude zero autocorrelation (CAZAC) sequence of length 12 is mainly used. Since the CAZAC sequence has a characteristic of maintaining constant amplitude in time domain and frequency domain, the CAZAC sequence has an appropriate property to increase coverage in a manner of lowering peak-to-average power ratio (PARR) or cubic metric (CM) of a UE. And, the ACK/NACK information on a DL data transmission transmitted on the PUCCH is covered using an orthogonal sequence or an orthogonal cover (OC).

And, the control information transmitted on the PUCCH can be distinguished using a cyclically shifted sequence including a cyclic shift (CS) value different from each other. The cyclically shifted sequence can be generated in a manner that a base sequence is cyclically shifted as much as a specific cyclic shift (CS) amount. The specific CS amount is indicated by a CS index. The number of available cyclic shift may vary according to a delay spread of a channel. Various types of sequences can be used as the base sequence and the aforementioned CAZAC sequence corresponds to one example of the base sequence.

And, the amount of control information capable of being transmitted by a UE in a subframe can be determined according to the number (i.e., SC-FDMA symbols except an SC-FDMA symbol used for transmitting a reference signal (RS) to detect coherent of the PUCCH) of SC-FDMA symbol available to transmit the control information.

PUCCH format 1 is used to solely transmit an SR. In case of solely transmitting the SR, a wave, which is not modulated, is applied. This shall be described in detail later.

PUCCH format 1a or 1b is used to transmit HARQ ACK/NACK. In case of solely transmitting the HARQ ACK/NACK in a random subframe, the PUCCH format 1a or 1b can be used. Or, the HARQ ACK/NACK and the SR may be transmitted in an identical subframe using the PUCCH format 1a or 1b.

PUCCH format 2 is used to transmit a CQI and PUCCH format 2a or 2b is used to transmit the CQI and the HARQ ACK/NACK. In case of an extended CP, the PUCCH format 2 may be used to transmit the CQI and the HARQ ACK/NACK.

Figure 6:
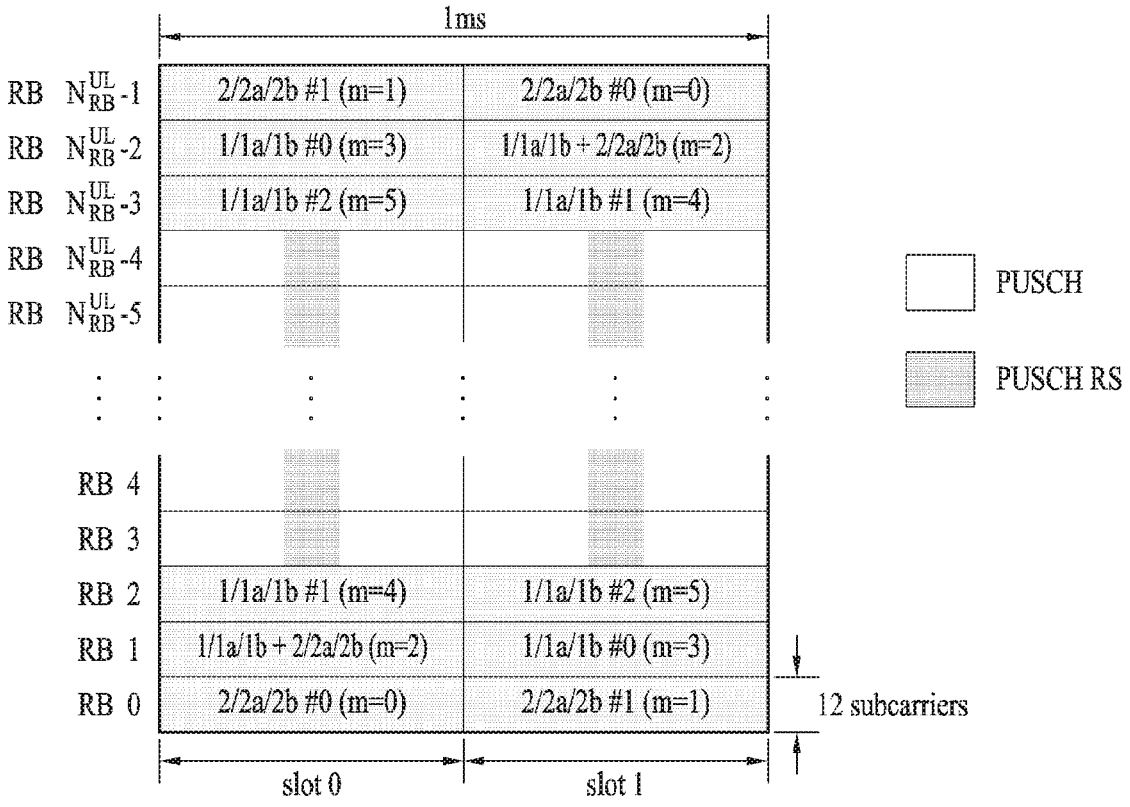
FIG. 6 is a diagram of a mapping form of PUCCH formats in an uplink physical resource block.

FIG. 6 is a diagram of a form that PUCCH formats map to PUCCH regions in an uplink physical resource block.

Referring to FIG. 5, $N_{RB}^{UL}$ indicates the number of resource blocks in UL and 0, 1, . . . $N_{RB}^{UL}-1$ means numbers of the physical resource block. Basically, PUCCH is mapped to both edges of a UL frequency block. As depicted in FIG. 5, PUCCH format 2/2a/2b are mapped to the PUCCH region displayed as m=0, 1. This may represent that the PUCCH format 2/2a/2b are mapped to resource blocks situated at a band-edge. And, the PUCCH format 2/2a/2b and PUCCH format 1/1a/1b can be mapped to a PUCCH region displayed as m=2 in a manner of being mixed. The PUCCH format 1/1a/1b can be mapped to a PUCCH region displayed as m=3, 4, 5. The number ($N_{RB}^{(2)}$) of PUCCH RBs usable by the PUCCH format 2/2a/2b can be directed to UEs in a cell by a broadcasting signaling.

1.3.2. PUCCH Resource

A base station (BS) assigns a PUCCH resource for transmitting uplink control information (UCI) to a UE by an explicit scheme via a higher layer signaling or an implicit scheme.

In case of ACK/NACK, a plurality of PUCCH resource candidates can be configured to a UE by a higher layer and which PUCCH resource is used among a plurality of the PUCCH resource candidates can be determined by the implicit scheme. For instance, the UE receives PDSCH from the BS and the ACK/NACK for a corresponding data unit can be transmitted via the PUCCH resource implicitly determined by PDCCH resource carrying scheduling information on the PDSCH.

Figure 7:
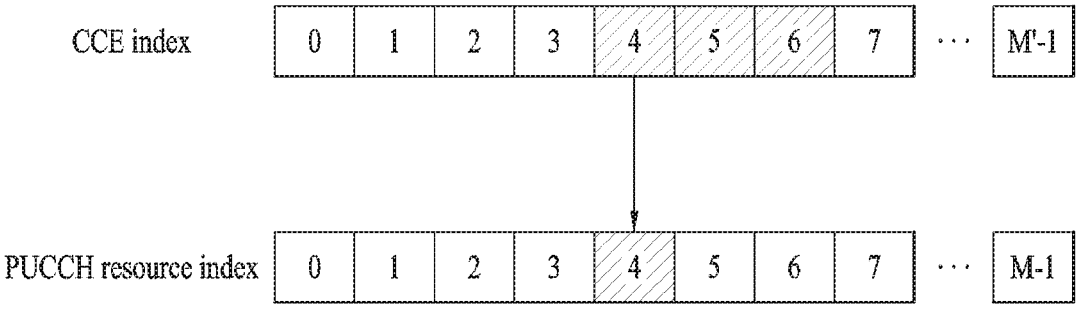
FIG. 7 is a diagram for an example of determining PUCCH resource for ACK/NACK.

FIG. 7 is a diagram for an example of determining PUCCH resource for ACK/NACK.

In LTE system, PUCCH resource for the ACK/NACK is not assigned to each UE in advance. Instead, a plurality of UEs in a cell uses a plurality of PUCCH resources on every timing point in a manner of dividing a plurality of the PUCCH resources. Specifically, the PUCCH resource used for transmitting the ACK/NACK by the UE is determined by an implicit scheme based on the PDCCH carrying scheduling information on PDSCH, which carries a corresponding DL data. A whole region to which the PDCCH is transmitted in each DL subframe consists of a plurality of control channel elements (CCE). And, the PDCCH transmitted to the UE consists of one or more CCEs. The CCE includes a plurality of REGs (resource element group). One REG consists of 4 adjacent REs (resource element) except a reference signal (RS). The UE transmits the ACK/NACK via an implicit resource derived or calculated by a function of a specific CCE index (e.g., a first or a lowest CCE index) among the indexes of CCEs for configuring the PDCCH received by the UE.

Referring to FIG. 7, each of the PUCCH resource indexes corresponds to the PUCCH resource for the ACK/NACK. If it is assumed that scheduling information on PDSCH is transmitted to a UE via PDCCH configured with $4^{th}$~$6^{th}$ CCE, the UE transmits the ACK/NACK to the BS via PUCCH, e.g., $4^{th}$ PUCCH, derived or calculated by the index of the $4^{th}$ CCE, which is the lowest CCE for configuring the PDCCH. FIG. 7 shows an example that maximum M' number of CCE exist in DL and maximum M number of PUCCH exist in UL. Although the M' and the M may be identical to each other, it is also possible to design a value of the M' to be different from a value of the M. And, it is also possible to make mapping of the CCE overlap the mapping of the PUCCH resource.

For instance, the PUCCH resource index can be determined as follows.

$$n_{PUCCH}^{(1)}=n_{CCE}+N_{PUCCH}^{(1)} \quad \text{[Equation 3]}$$

In this case, n(1)PUCCH indicates the PUCCH resource index to transmit the ACK/NACK and N(1)PUCCH indicates a signaling value delivered from a upper layer. The nCCE may indicate a smallest value among the CCE indexes used for PDCCH transmission. PUCCH is explained in more detail in the following description.

1.3.3. PUCCH Channel Structure

First of all, PUCCH format 1a and 1b are explained.

In the PUCCH format 1a/1b, a symbol modulated using the BPSK or QPSK modulation scheme is multiplied by a CAZAC sequence of length 12. For instance, a result of multiplying a modulated symbol d(0) by a CAZAC sequence r(n) of length N corresponds to y(0), y(1), y(2), . . . , y(N−1). The y(0), . . . , the y(N−1) symbols may be called a symbol block (block of symbol). After a modulated symbol is multiplied by a CAZAC sequence, a block-wise spreading using an orthogonal sequence is applied.

For normal ACK/NACK information, a Hadamard sequence of length 4 is used. For shortened ACK/NACK information and a reference signal, a Discrete Fourier Transform (DFT) sequence of length 3 is used. For a reference signal in case of an extended CP, a Hadamard sequence of length 2 is used.

Figure 8:
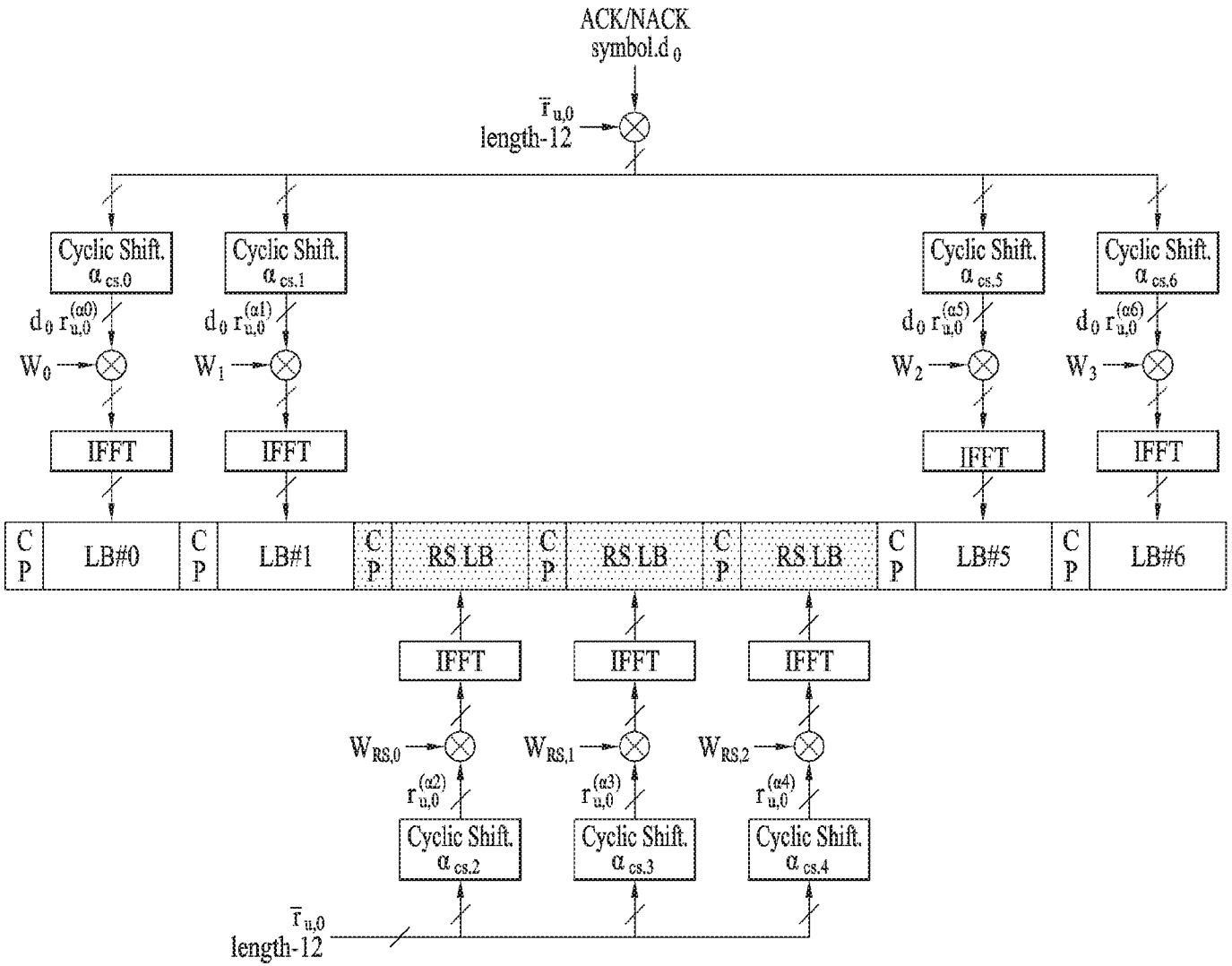
FIG. 8 is a diagram for a structure of an ACK/NACK channel in case of a normal CP.

FIG. 8 is a diagram for a structure of an ACK/NACK channel in case of a normal CP. A PUCCH channel structure to transmit HARQ ACK/NACK without a CQI is exemplified in FIG. 8. Among the 7 SC-FDMA symbols included in one slot, three consecutive SC-FDMA symbols in the middle part of the slot load a reference signal (RS) and the rest of 4 SC-FDMA symbols load an ACK/NACK signal. Meanwhile, in case of an extended CP, two consecutive symbols situated in the middle may load the RS. The number of symbol and the position of symbol used for the RS may vary according to a control channel. And, the number of symbol and the position of symbol used for the ACK/NACK signal may vary according to the control channel as well.

Confirmation response information (in a state of not scrambled) of 1 bit and 2 bits can be represented as one HARQ ACK/NACK modulated symbol using BPSK and QPSK modulation scheme, respectively. A positive confirmation response (ACK) can be encoded by '1' and a negative confirmation response (NACK) can be encoded by '0'.

When a control signal is transmitted in an assigned band, 2 dimensional spread is applied to increase a multiplexing capacity. In particular, frequency domain spread and time domain spread are simultaneously applied to increase the number of UE and the number of control channel capable of being multiplexed. In order to spread the ACK/NACK signal in frequency domain, a frequency domain sequence is used as a base sequence. As the frequency domain sequence, a Zadoff-Chu (ZC) sequence, which is one of the CAZAC sequence, can be used. For instance, by applying a cyclic shift (CS) different from each other to the ZC sequence, which is the base sequence, multiplexing of UEs different from each other or multiplexing of control channels different from each other can be applied. The number of CS resource, which is supported by a SC-FDMA symbol for PUCCH RBs, to transmit the HARQ ACK/NACK is configured by a cell-specific upper layer signaling parameter ($\Delta_{shift}^{PUCCH}$) and $\Delta_{shift}^{PUCCH}\in\{1, 2, 3\}$ indicates 12, 6, or 4 shift, respectively.

A frequency domain spread ACK/NACK signal is spread in time domain using an orthogonal spreading code. As the orthogonal spreading code, a Walsh-Hadamard sequence or a DFT sequence can be used. For instance, an ACK/NACK signal can be spread for 4 symbols using an orthogonal sequence (w0, w1, w2, w3) of length 4. And, an RS is spread using an orthogonal sequence of length 3 or length 2. This is called an orthogonal covering (OC).

As mentioned in the foregoing description, a plurality of UEs can be multiplexed by a code division multiplexing (CDM) scheme using a CS resource in frequency domain and an OC resource in time domain. In particular, the ACK/NACK information and the RS of a plurality of the UEs can be multiplexed on an identical PUCCH RB.

For the aforementioned time domain spread CDM, the number of spreading codes supporting the ACK/NACK information is restricted by the number of RS symbols. In particular, since the number of SC-FDMA symbols transmitting the RS is less than the number of SC-FDMA symbols transmitting the ACK/NACK information, multiplexing capacity of the RS is smaller than the multiplexing capacity of the ACK/NACK information. For instance, in case of a normal CP, the ACK/NACK information can be transmitted in four symbols. In this case, not four orthogonal spreading codes but three orthogonal spreading codes are used for the ACK/NACK information. This is because only three orthogonal spreading codes can be used for the RS, since the number of RS transmission symbol is restricted to three.

An example of the orthogonal sequence used for the spread of the ACK/NACK information is shown in Table 6 and Table 7. Table 6 indicates a sequence for a symbol of length 4 and Table 7 indicates a sequence for a symbol of length 3. The sequence for the symbol of length 4 is used in PUCCH format 1/1a/1b of a normal subframe configuration. In case of configuring a subframe, the sequence for the symbol of length 4 is applied in a first slot and a shortened PUCCH format 1/1a/1b of the sequence for a symbol of length 3 can be applied in a second slot in consideration of a case that a sounding reference signal (SRS) is transmitted in a last symbol of the second slot.

TABLE 6

| sequence index | {w(0), w(1), w(2), w(3)} |
|---|---|
| 0 | [+1 +1 +1 +1] |
| 1 | [+1 −1 +1 −1] |
| 2 | [+1 −1 −1 +1] |

TABLE 7

| sequence index | (0), w(1), w(2), w(3)} |
|---|---|
| 0 | [1 1 1] |
| 1 | $[1\ e^{j2\pi/3}\ e^{j4\pi/3}]$ |
| 2 | $[1\ e^{j4\pi/3}\ e^{j2\pi/3}]$ |

TABLE 8

| sequence index | normal CP | extended CP |
|---|---|---|
| 0 | [1 1 1] | [1 1] |
| 1 | $[1\ e^{j2\pi/3}\ e^{j4\pi/3}]$ | [1 − 1] |
| 2 | $[1\ e^{j4\pi/3}\ e^{j2\pi/3}]$ | N/A |

In case that 3 symbols are used for RS transmission and 4 symbols are used for ACK/NACK information transmission in a subframe of a normal CP, for instance, if 6 cyclic shifts (CS) in frequency domain and 3 orthogonal cover (OC) resources in time domain are available, HARQ confirmation responses from a total 18 different UEs can be multiplexed in one PUCCH RB. In case that 2 symbols are used for RS transmission and 4 symbols are used for ACK/NACK information transmission in a subframe of an extended CP, for instance, if 6 cyclic shifts (CS) in frequency domain and 2 orthogonal cover (OC) resources in time domain are available, HARQ confirmation responses from a total 12 different UEs can be multiplexed in one PUCCH RB.

Subsequently, PUCCH format 1 is explained. A scheduling request (SR) is transmitted in a manner that a UE makes a request to be scheduled or the UE does not make a request to be scheduled. An SR channel reuses an ACK/NACK channel structure of a PUCCH format 1a/1b and is configured with an on-off keying (OOK) scheme based on an ACK/NACK channel design. A reference signal is not transmitted on the SR channel. Hence, a sequence of length 7 is used in case of a normal CP and a sequence of length 6 is used in case of an extended CP. A different cyclic shift or an orthogonal cover can be assigned to an SR and an ACK/NACK. In particular, a UE transmits a HARQ ACK/NACK via a resource allocated for an SR to transmit a positive SR. The UE transmits the HARQ ACK/NACK via a resource allocated for an ACK/NACK to transmit a negative SR.

Subsequently, PUCCH format 2/2a/2b is explained. The PUCCH format 2/2a/2b is a control channel to transmit a channel measurement feedback (CQI, PMI, RI).

A reporting cycle of the channel measurement feedback (hereinafter commonly called CQI information) and a frequency unit (or a frequency resolution), which becomes an object of measuring, can be controlled by an eNode B. A periodic and an aperiodic CQI report can be supported in time domain. A PUCCH format 2 is used for the periodic report only and PUSCH can be used for the aperiodic report. In case of the aperiodic report, an eNode B can direct a UE to transmit a scheduled resource in a manner of loading a separate CQI report on the scheduled resource to transmit a UL data.

Figure 9:
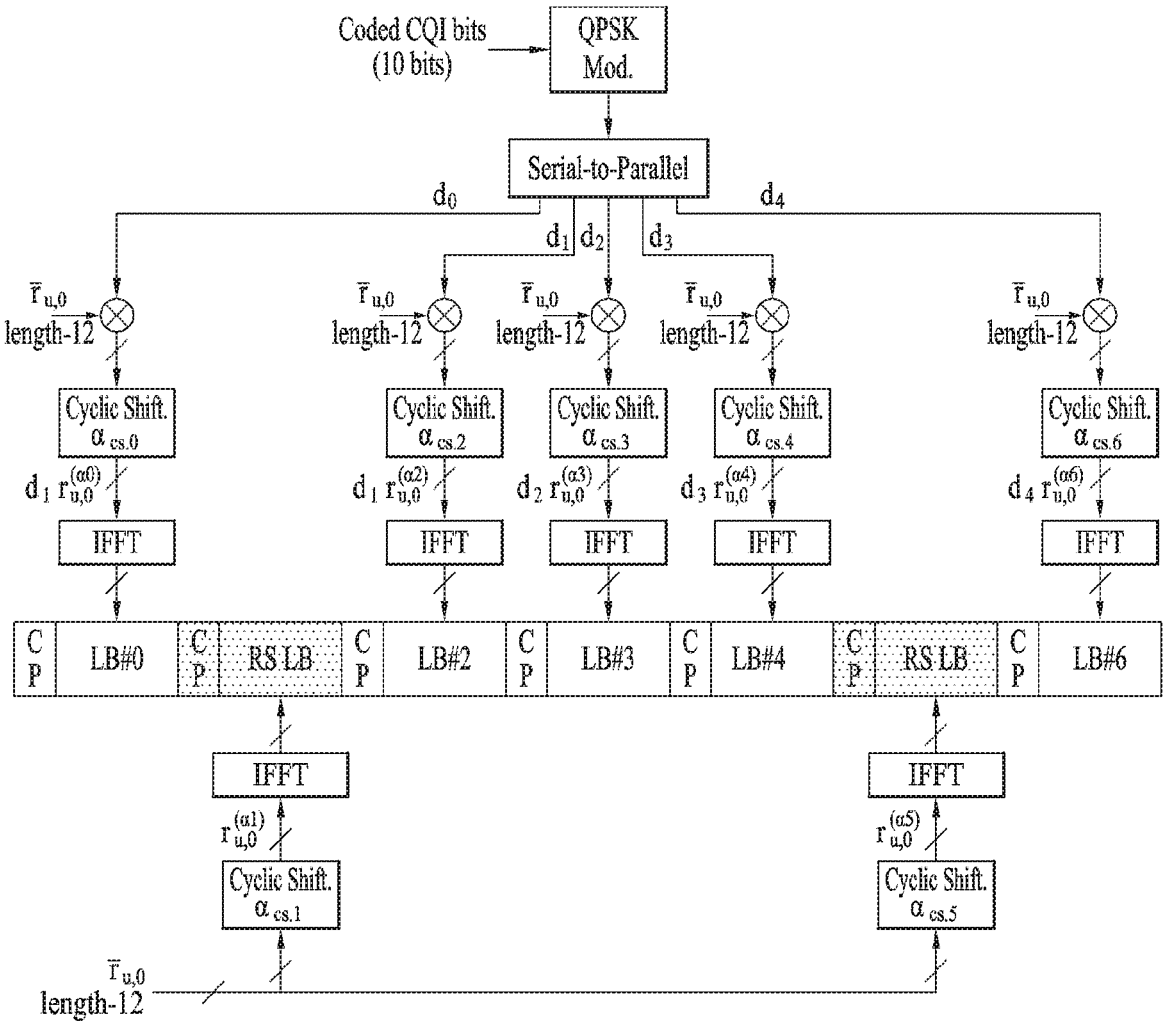
FIG. 9 is a diagram for a structure of a CQI channel in case of a normal CP.

FIG. 9 is a diagram for a structure of a CQI channel in case of a normal CP. Among FDMA symbol 0 to 6 in one slot, SC-FDMA symbol 1 and 5 (i.e., second and sixth symbol) are used to transmit a demodulation reference signal (DMRS) and the rest of the SC-FDMA symbols are used to transmit CQI information. Meanwhile, in case of an extended CP, one SC-FDMA symbol (i.e., SC-FDMA symbol 3) is used to transmit a DMRS.

PUCCH format 2/2a/2b supports a modulation performed by a CAZAC sequence and a symbol modulated by QPSK scheme is multiplied by a CAZAC sequence of length 12. A cyclic shift (CS) of a sequence is modified between a symbol and a slot. An orthogonal covering is used for a DMRS.

Among the 7 SC-FDMA symbols included in one slot, a reference signal (DMRS) is loaded on 2 SC-FDMA symbols apart from as much as a space of 3 SC-FDMA symbols and CQI information is loaded on the rest of the 5 SC-FDMA symbols. Using two RSs in one slot is to support a fast UE. And, each UE is distinguished using a cyclic shift (CS) sequence. CQI information symbols are delivered to all SC-FDMA symbols in a manner of being modulated and an SC-FDMA symbol is configured with one sequence. In particular, a UE transmits a CQI in a manner of modulating the CQI with each sequence.

The number of symbols capable of being transmitted in one TTI corresponds to 10 and a modulation scheme of CQI information is determined up to QPSK. In case of using QPSK mapping for an SC-FDMA symbol, since a CQI value of 2-bit can be loaded, the CQI value of 10-bit can be loaded in one slot. Hence, the CQI value of maximum 20 bits can be loaded in one subframe. A frequency domain spreading code is used to spread the CQI information in frequency domain.

A CAZAC sequence (e.g., a ZC sequence) of length-12 can be used as the frequency domain spreading code. Each control channel can be distinguished by applying the CAZAC sequence including a cyclic shift value different from each other. An IFFT is performed on the frequency domain spread CQI information.

12 different UEs can be orthogonally multiplexed in an identical PUCCH RB by a cyclic shift including 12 same intervals. In case of a normal CP, a DMRS sequence on the SC-FDMA symbol 1 and 5 (in case of an extended CP, SC-FDMA symbol 3) is similar to a CQI signal sequence in frequency domain. Yet, a modulation applied to the CQI information is not applied to the DMRS sequence. A UE can be semi-statically configured by an upper layer signaling to periodically report different types of CQI, PMI and RI on a PUCCH resource indicated by a PUCCH resource index ($n_{PUCCH}^{(2)}$). In this case, the PUCCH resource index ($n_{PUCCH}^{(2)}$) is information to indicate a PUCCH region used for PUCCH format 2/2a/2b transmission and a cyclic shift (CS) value to be used.

Subsequently, an enhanced-PUCCH (e-PUCCH) format is explained. The e-PDCCH may correspond to a PUCCH format 3 of LTE-A system. A block spreading scheme can be applied to an ACK/NACK transmission using the PUCCH format 3.

Figure 10:
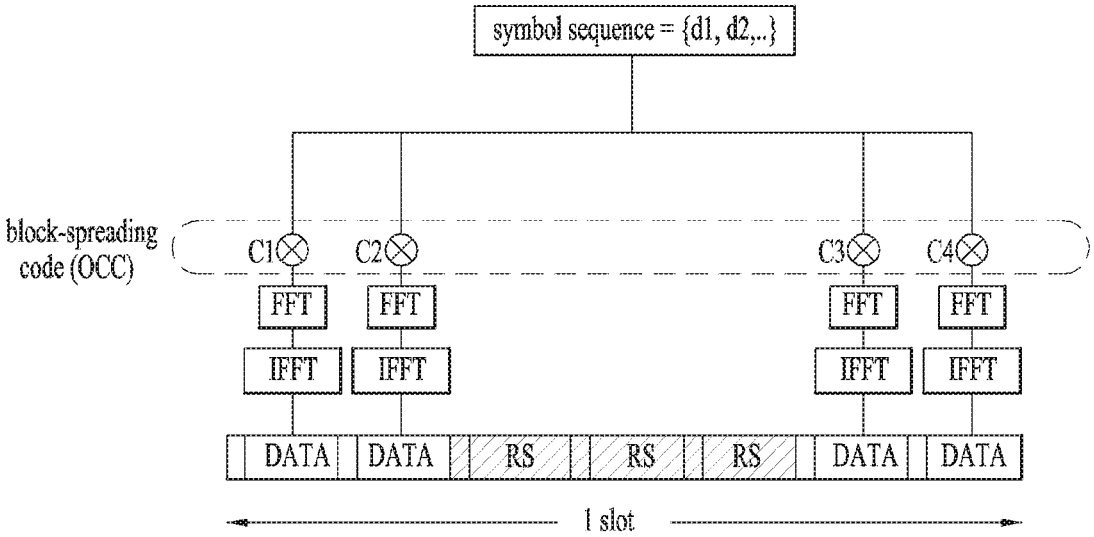
FIG. 10 is a diagram for a PUCCH channel structure using block spreading.
Figure 10:
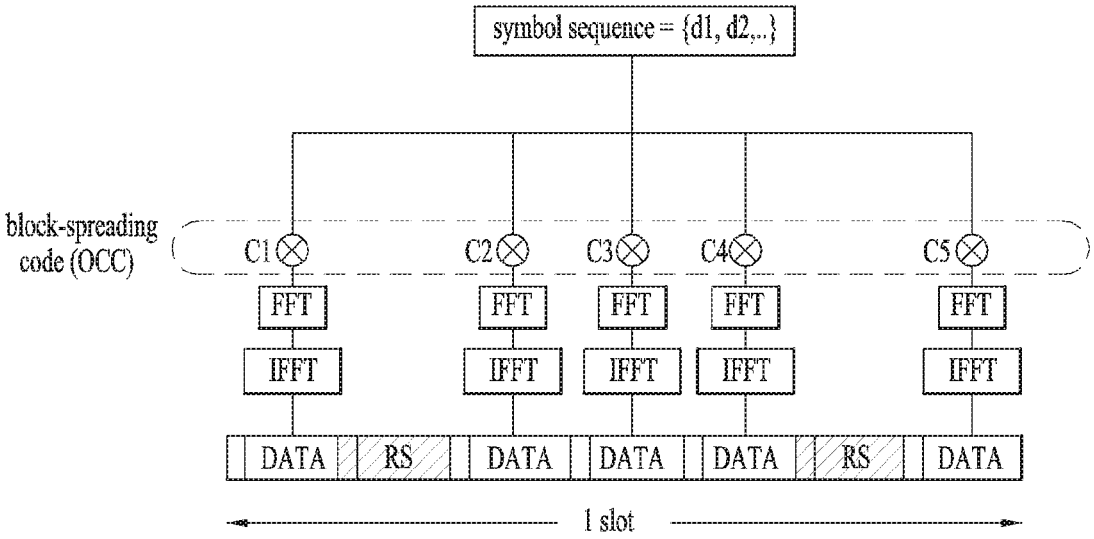

Unlike a legacy PUCCH format 1 series or 2 series, the block spreading scheme is a scheme for modulating a control signal transmission using an SC-FDMA scheme. As shown in FIG. 10, a symbol sequence can be transmitted in time domain in a manner of being spread using an orthogonal cover code (OCC). By using the OCC, control signals of a plurality of UEs in an identical RB can be multiplexed. In case of the aforementioned PUCCH format 2, one symbol sequence is transmitted in a manner of being spanned in time domain and the control signals of a plurality of the UEs are multiplexed using the CS (cyclic shift) of the CAZAC sequence. On the other hand, in case of the block spreading-based PUCCH format (e.g., PUCCH format 3), one symbol sequence is transmitted in a manner of being spanned in frequency domain and the control signals of a plurality of the UEs are multiplexed by using time domain spreading using the OCC.

FIG. 10 (a) indicates an example that 4 SC-FDMA symbols (i.e., data part) are generated using an OCC of length 4 (or a spreading factor (SF)=4) in one symbol sequence and are transmitted in one slot. In this case, 3 RS symbols (i.e., RS part) can be used in one slot.

FIG. 10 (b) indicates an example that 5 SC-FDMA symbols (i.e., data part) are generated using an OCC of length 5 (or a spreading factor (SF)=5) in one symbol sequence and are transmitted in one slot. In this case, 2 RS symbols can be used in one slot.

Referring to the example of FIG. 10, the RS symbol can be generated from a CAZAC sequence to which a specific cyclic shift value is applied and can be transmitted in a form that a prescribed OCC is applied (or multiplied) to a plurality of RS symbols. And, in the example of FIG. 10, if it is assumed that 12 modulation symbols are used according to each OFDM symbol (or SC-FDMA symbol) and each modulation symbol is generated by QPSK scheme, maximum bit number capable of being transmitted in one slot becomes 12*2=24 bits. Hence, the bit number capable of being transmitted by 2 slots becomes a total 48 bits. As mentioned earlier, in case of using the PUCCH channel structure of the block spreading scheme, it enables to transmit control information of an extended size compared to a legacy PDCCH format 1 series and 2 series.

2. Carrier Aggregation (CA) Environment 2.1 CA Overview

A 3GPP LTE system (conforming to Rel-8 or Rel-9) (hereinafter, referred to as an LTE system) uses Multi-Carrier Modulation (MCM) in which a single Component Carrier (CC) is divided into a plurality of bands. In contrast, a 3GPP LTE-A system (hereinafter, referred to an LTE-A system) may use CA by aggregating one or more CCs to support a broader system bandwidth than the LTE system. The term CA is interchangeably used with carrier combining, multi-CC environment, or multi-carrier environment.

In the present disclosure, multi-carrier means CA (or carrier combining). Herein, CA covers aggregation of contiguous carriers and aggregation of non-contiguous carriers. The number of aggregated CCs may be different for a DL and a UL. If the number of DL CCs is equal to the number of UL CCs, this is called symmetric aggregation. If the number of DL CCs is different from the number of UL CCs, this is called asymmetric aggregation. The term CA is interchangeable with carrier combining, bandwidth aggregation, spectrum aggregation, etc.

The LTE-A system aims to support a bandwidth of up to 100 MHz by aggregating two or more CCs, that is, by CA. To guarantee backward compatibility with a legacy IMT system, each of one or more carriers, which has a smaller bandwidth than a target bandwidth, may be limited to a bandwidth used in the legacy system.

For example, the legacy 3GPP LTE system supports bandwidths {1.4, 3, 5, 10, 15, and 20 MHz} and the 3GPP LTE-A system may support a broader bandwidth than 20 MHz using these LTE bandwidths. A CA system of the present disclosure may support CA by defining a new bandwidth irrespective of the bandwidths used in the legacy system.

There are two types of CA, intra-band CA and inter-band CA. Intra-band CA means that a plurality of DL CCs and/or UL CCs are successive or adjacent in frequency. In other words, the carrier frequencies of the DL CCs and/or UL CCs are positioned in the same band. On the other hand, an environment where CCs are far away from each other in frequency may be called inter-band CA. In other words, the carrier frequencies of a plurality of DL CCs and/or UL CCs are positioned in different bands. In this case, a UE may use a plurality of Radio Frequency (RF) ends to conduct communication in a CA environment.

The LTE-A system adopts the concept of cell to manage radio resources. The above-described CA environment may be referred to as a multi-cell environment. A cell is defined as a pair of DL and UL CCs, although the UL resources are not mandatory. Accordingly, a cell may be configured with DL resources alone or DL and UL resources.

For example, if one serving cell is configured for a specific UE, the UE may have one DL CC and one UL CC. If two or more serving cells are configured for the UE, the UE may have as many DL CCs as the number of the serving cells and as many UL CCs as or fewer UL CCs than the number of the serving cells, or vice versa. That is, if a plurality of serving cells are configured for the UE, a CA environment using more UL CCs than DL CCs may also be supported.

CA may be regarded as aggregation of two or more cells having different carrier frequencies (center frequencies). Herein, the term 'cell' should be distinguished from 'cell' as a geographical area covered by an eNB. Hereinafter, intra-band CA is referred to as intra-band multi-cell and inter-band CA is referred to as inter-band multi-cell.

In the LTE-A system, a Primacy Cell (PCell) and a Secondary Cell (SCell) are defined. A PCell and an SCell may be used as serving cells. For a UE in RRC_CONNECTED state, if CA is not configured for the UE or the UE does not support CA, a single serving cell including only a PCell exists for the UE. On the contrary, if the UE is in RRC_CONNECTED state and CA is configured for the UE, one or more serving cells may exist for the UE, including a PCell and one or more SCells.

Serving cells (PCell and SCell) may be configured by an RRC parameter. A physical-layer ID of a cell, PhysCellId is an integer value ranging from 0 to 503. A short ID of an SCell, SCellIndex is an integer value ranging from 1 to 7. A short ID of a serving cell (PCell or SCell), ServeCellIndex is an integer value ranging from 1 to 7. If ServeCellIndex is 0, this indicates a PCell and the values of ServeCellIndex for SCells are pre-assigned. That is, the smallest cell ID (or cell index) of ServeCellIndex indicates a PCell.

A PCell refers to a cell operating in a primary frequency (or a primary CC). A UE may use a PCell for initial connection establishment or connection reestablishment. The PCell may be a cell indicated during handover. In addition, the PCell is a cell responsible for control-related communication among serving cells configured in a CA environment. That is, PUCCH allocation and transmission for the UE may take place only in the PCell. In addition, the UE may use only the PCell in acquiring system information or changing a monitoring procedure. An Evolved Universal Terrestrial Radio Access Network (E-UTRAN) may change only a PCell for a handover procedure by a higher-layer RRCConnectionReconfiguration message including mobilityControlInfo to a UE supporting CA.

An SCell may refer to a cell operating in a secondary frequency (or a secondary CC). Although only one PCell is allocated to a specific UE, one or more SCells may be allocated to the UE. An SCell may be configured after RRC connection establishment and may be used to provide additional radio resources. There is no PUCCH in cells other than a PCell, that is, in SCells among serving cells configured in the CA environment.

When the E-UTRAN adds an SCell to a UE supporting CA, the E-UTRAN may transmit all system information related to operations of related cells in RRC_CONNECTED state to the UE by dedicated signaling. Changing system information may be controlled by releasing and adding a related SCell. Herein, a higher-layer RRCConnectionReconfiguration message may be used. The E-UTRAN may transmit a dedicated signal having a different parameter for each cell rather than it broadcasts in a related SCell.

After an initial security activation procedure starts, the E-UTRAN may configure a network including one or more SCells by adding the SCells to a PCell initially configured during a connection establishment procedure. In the CA environment, each of a PCell and an SCell may operate as a CC. Hereinbelow, a Primary CC (PCC) and a PCell may be used in the same meaning and a Secondary CC (SCC) and an SCell may be used in the same meaning in embodiments of the present disclosure.

Figure 11:
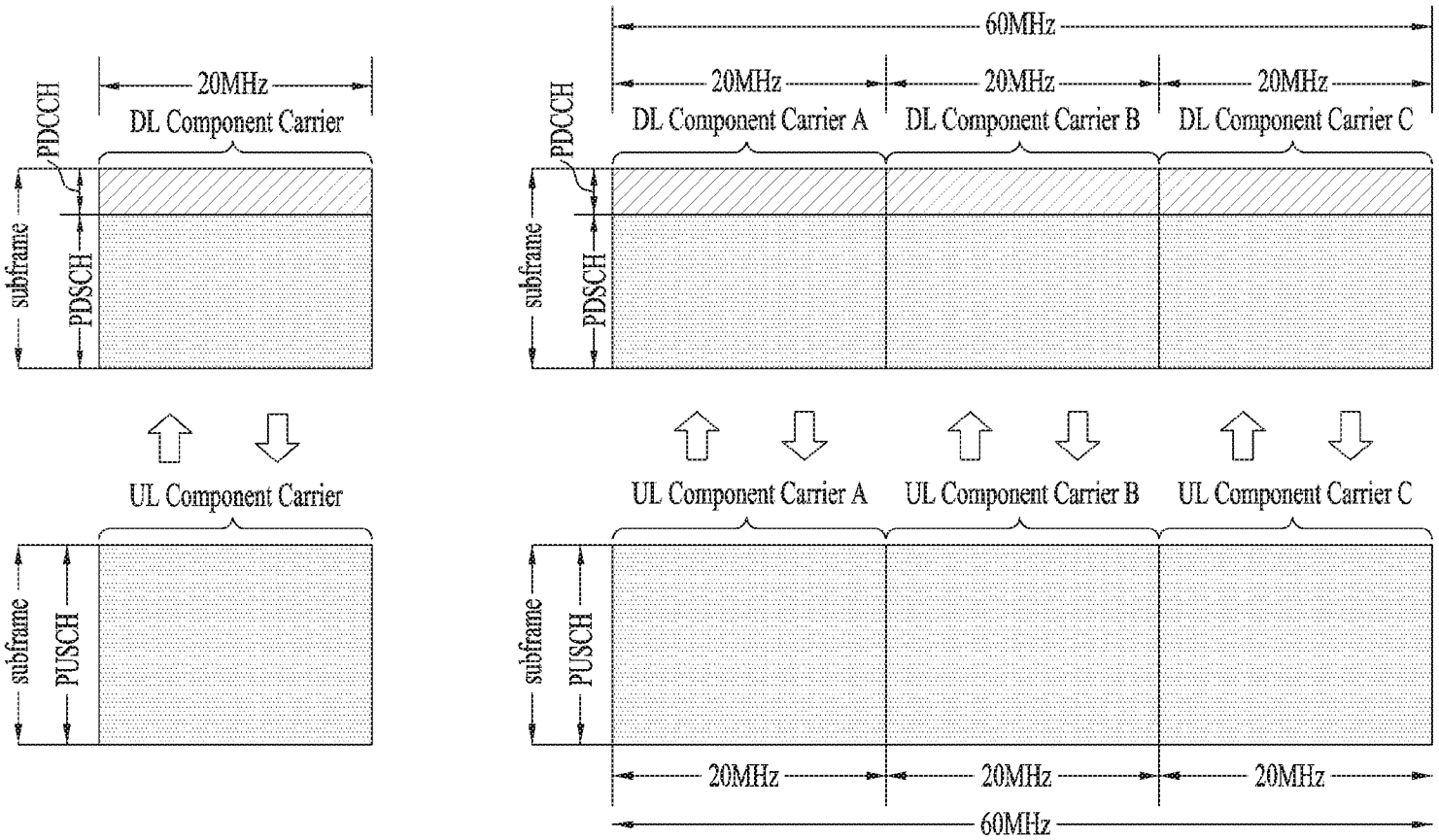
FIG. 11 is a view illustrating an example of Component Carriers (CCs) and Carrier Aggregation (CA) in a Long Term Evolution-Advanced (LTE-A) system.

FIG. 11 illustrates an example of CCs and CA in the LTE-A system, which are used in embodiments of the present disclosure.

FIG. 11(a) illustrates a single carrier structure in the LTE system. There are a DL CC and a UL CC and one CC may have a frequency range of 20 MHz.

FIG. 11(b) illustrates a CA structure in the LTE-A system. In the illustrated case of FIG. 11(b), three CCs each having 20 MHz are aggregated. While three DL CCs and three UL CCs are configured, the numbers of DL CCs and UL CCs are not limited. In CA, a UE may monitor three CCs simultaneously, receive a DL signal/DL data in the three CCs, and transmit a UL signal/UL data in the three CCs.

If a specific cell manages N DL CCs, the network may allocate M (M≤N) DL CCs to a UE. The UE may monitor only the M DL CCs and receive a DL signal in the M DL CCs. The network may prioritize L (L≤M≤N) DL CCs and allocate a main DL CC to the UE. In this case, the UE should monitor the L DL CCs. The same thing may apply to UL transmission.

The linkage between the carrier frequencies of DL resources (or DL CCs) and the carrier frequencies of UL resources (or UL CCs) may be indicated by a higher-layer message such as an RRC message or by system information. For example, a set of DL resources and UL resources may be configured based on linkage indicated by System Information Block Type 2 (SIB2). Specifically, DL-UL linkage may refer to a mapping relationship between a DL CC carrying a PDCCH with a UL grant and a UL CC using the UL grant, or a mapping relationship between a DL CC (or a UL CC) carrying HARQ data and a UL CC (or a DL CC) carrying an HARQ ACK/NACK signal.

2.2 Cross Carrier Scheduling

Two scheduling schemes, self-scheduling and cross carrier scheduling are defined for a CA system, from the perspective of carriers or serving cells. Cross carrier scheduling may be called cross CC scheduling or cross cell scheduling.

In self-scheduling, a PDCCH (carrying a DL grant) and a PDSCH are transmitted in the same DL CC or a PUSCH is transmitted in a UL CC linked to a DL CC in which a PDCCH (carrying a UL grant) is received.

In cross carrier scheduling, a PDCCH (carrying a DL grant) and a PDSCH are transmitted in different DL CCs or a PUSCH is transmitted in a UL CC other than a UL CC linked to a DL CC in which a PDCCH (carrying a UL grant) is received.

Cross carrier scheduling may be activated or deactivated UE-specifically and indicated to each UE semi-statically by higher-layer signaling (e.g. RRC signaling).

If cross carrier scheduling is activated, a Carrier Indicator Field (CIF) is required in a PDCCH to indicate a DL/UL CC in which a PDSCH/PUSCH indicated by the PDCCH is to be transmitted. For example, the PDCCH may allocate PDSCH resources or PUSCH resources to one of a plurality of CCs by the CIF. That is, when a PDCCH of a DL CC allocates PDSCH or PUSCH resources to one of aggregated DL/UL CCs, a CIF is set in the PDCCH. In this case, the DCI formats of LTE Release-8 may be extended according to the CIF. The CIF may be fixed to three bits and the position of the CIF may be fixed irrespective of a DCI format size. In addition, the LTE Release-8 PDCCH structure (the same coding and resource mapping based on the same CCEs) may be reused.

On the other hand, if a PDCCH transmitted in a DL CC allocates PDSCH resources of the same DL CC or allocates PUSCH resources in a single UL CC linked to the DL CC, a CIF is not set in the PDCCH. In this case, the LTE Release-8 PDCCH structure (the same coding and resource mapping based on the same CCEs) may be used.

If cross carrier scheduling is available, a UE needs to monitor a plurality of PDCCHs for DCI in the control region of a monitoring CC according to the transmission mode and/or bandwidth of each CC. Accordingly, an appropriate SS configuration and PDCCH monitoring are needed for the purpose.

In the CA system, a UE DL CC set is a set of DL CCs scheduled for a UE to receive a PDSCH, and a UE UL CC set is a set of UL CCs scheduled for a UE to transmit a PUSCH. A PDCCH monitoring set is a set of one or more DL CCs in which a PDCCH is monitored. The PDCCH monitoring set may be identical to the UE DL CC set or may be a subset of the UE DL CC set. The PDCCH monitoring set may include at least one of the DL CCs of the UE DL CC set. Or the PDCCH monitoring set may be defined irrespective of the UE DL CC set. DL CCs included in the PDCCH monitoring set may be configured to always enable self-scheduling for UL CCs linked to the DL CCs. The UE DL CC set, the UE UL CC set, and the PDCCH monitoring set may be configured UE-specifically, UE group-specifically, or cell-specifically.

If cross carrier scheduling is deactivated, this implies that the PDCCH monitoring set is always identical to the UE DL CC set. In this case, there is no need for signaling the PDCCH monitoring set. However, if cross carrier scheduling is activated, the PDCCH monitoring set may be defined within the UE DL CC set. That is, the eNB transmits a PDCCH only in the PDCCH monitoring set to schedule a PDSCH or PUSCH for the UE.

Figure 12:
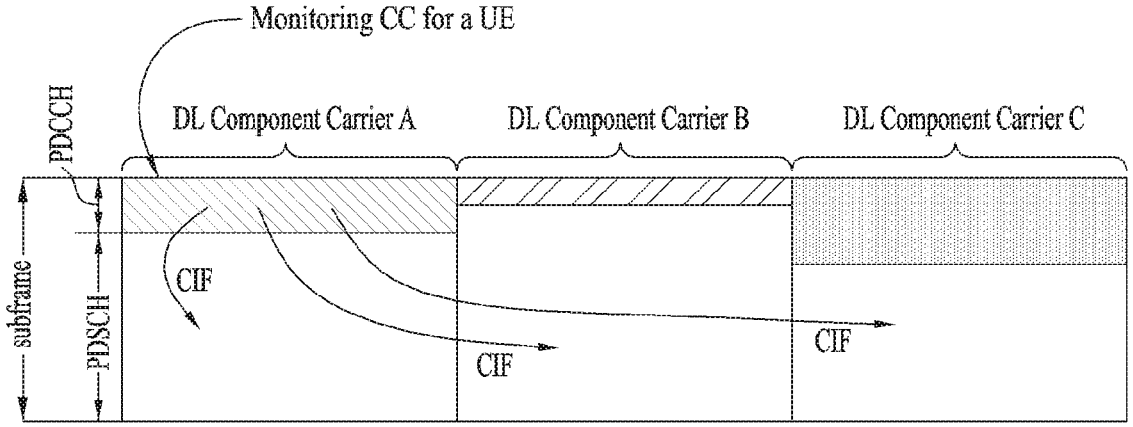
FIG. 12 is a view illustrating a subframe structure based on cross-carrier scheduling in the LTE-A system.

FIG. 12 illustrates a cross carrier-scheduled subframe structure in the LTE-A system, which is used in embodiments of the present disclosure.

Referring to FIG. 12, three DL CCs are aggregated for a DL subframe for LTE-A UEs. DL CC 'A' is configured as a PDCCH monitoring DL CC. If a CIF is not used, each DL CC may deliver a PDCCH that schedules a PDSCH in the same DL CC without a CIF. On the other hand, if the CIF is used by higher-layer signaling, only DL CC 'A' may carry a PDCCH that schedules a PDSCH in the same DL CC 'A' or another CC. Herein, no PDCCH is transmitted in DL CC 'B' and DL CC 'C' that are not configured as PDCCH monitoring DL CCs.

Figure 13:
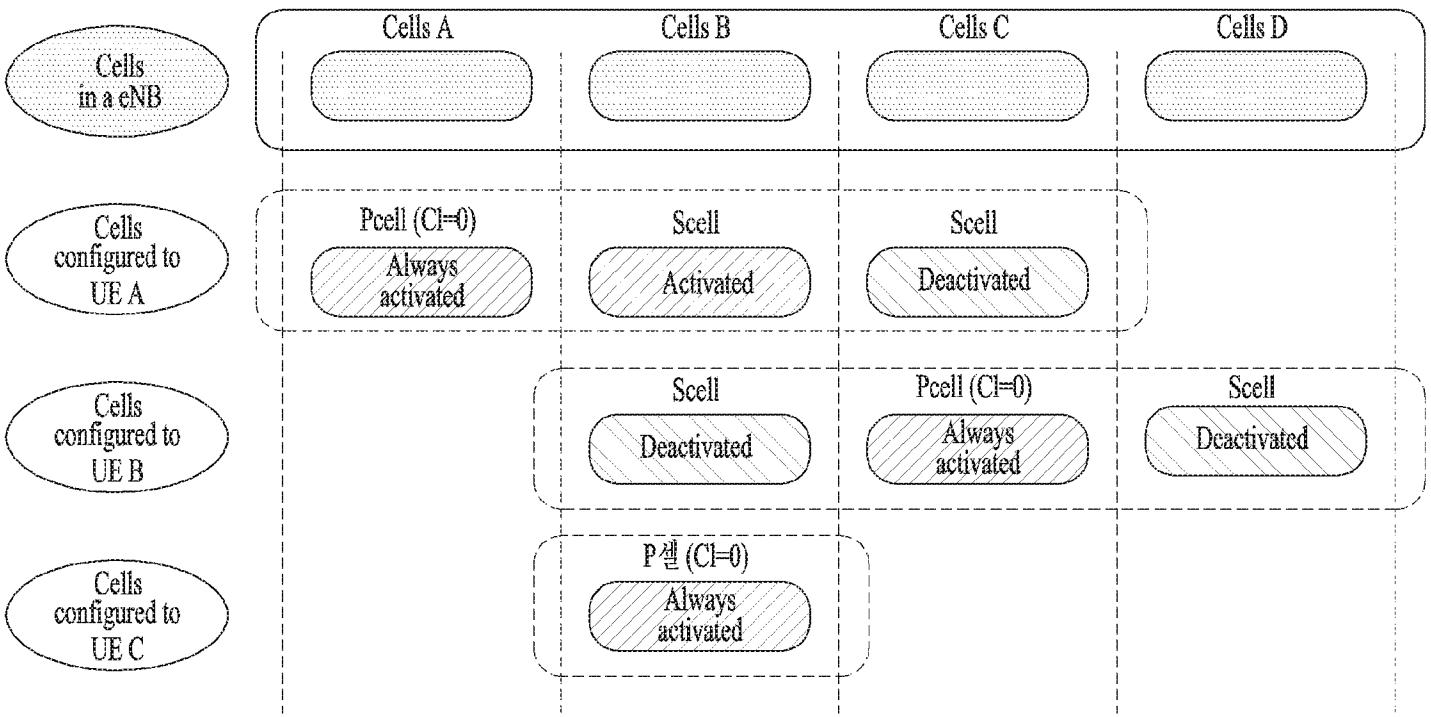
FIG. 13 is a view illustrating an exemplary serving cell configuration based on cross-carrier scheduling.

FIG. 13 is conceptual diagram illustrating a construction of serving cells according to cross-carrier scheduling.

Referring to FIG. 13, an eNB (or BS) and/or UEs for use in a radio access system supporting carrier aggregation (CA) may include one or more serving cells. In FIG. 13, the eNB can support a total of four serving cells (cells A, B, C and D). It is assumed that UE A may include Cells (A, B, C), UE B may include Cells (B, C, D), and UE C may include Cell B. In this case, at least one of cells of each UE may be composed of PCell. In this case, PCell is always activated, and SCell may be activated or deactivated by the eNB and/or UE.

The cells shown in FIG. 13 may be configured per UE. The above-mentioned cells selected from among cells of the eNB, cell addition may be applied to carrier aggregation (CA) on the basis of a measurement report message received from the UE. The configured cell may reserve resources for ACK/NACK message transmission in association with PDSCH signal transmission. The activated cell is configured to actually transmit a PDSCH signal and/or a PUSCH signal from among the configured cells, and is configured to transmit CSI reporting and Sounding Reference Signal (SRS) transmission. The deactivated cell is configured not to transmit/receive PDSCH/PUSCH signals by an eNB command or a timer operation, and CRS reporting and SRS transmission are interrupted.

2.3 CA Environment-Based CoMP Operation

Hereinafter, a cooperation multi-point (CoMP) transmission operation applicable to the embodiments of the present disclosure will be described.

In the LTE-A system, CoMP transmission may be implemented using a carrier aggregation (CA) function in the LTE. FIG. 9 is a conceptual view illustrating a CoMP system operating based on a CA environment.

Figure 14:
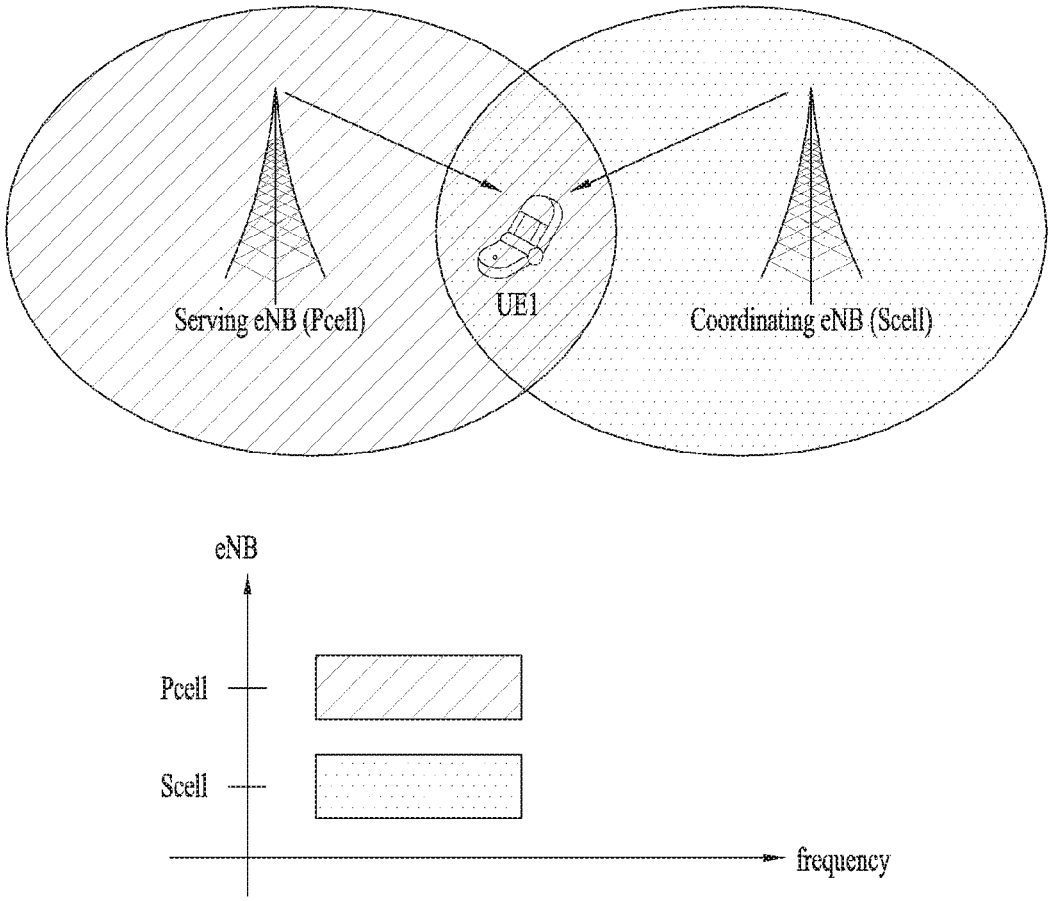
FIG. 14 is a conceptual view of a Coordinated Multi-Point (CoMP) system operating in a CA environment.

In FIG. 14, it is assumed that a carrier operated as a PCell and a carrier operated as an SCell may use the same frequency band on a frequency axis and are allocated to two eNBs geographically spaced apart from each other. At this time, a serving eNB of UE1 may be allocated to the PCell, and a neighboring cell causing much interference may be allocated to the SCell. That is, the eNB of the PCell and the eNB of the SCell may perform various DL/UL CoMP operations such as joint transmission (JT), CS/CB and dynamic cell selection for one UE.

FIG. 14 illustrates an example that cells managed by two eNBs are aggregated as PCell and SCell with respect to one UE (e.g., UE1). However, as another example, three or more cells may be aggregated. For example, some cells of three or more cells may be configured to perform CoMP operation for one UE in the same frequency band, and the other cells may be configured to perform simple CA operation in different frequency bands. At this time, the PCell does not always need to participate in CoMP operation.

2.4 Reference Signal (RS)

Now, a description will be given of RSs which may be used in embodiments of the present disclosure.

Figure 15:
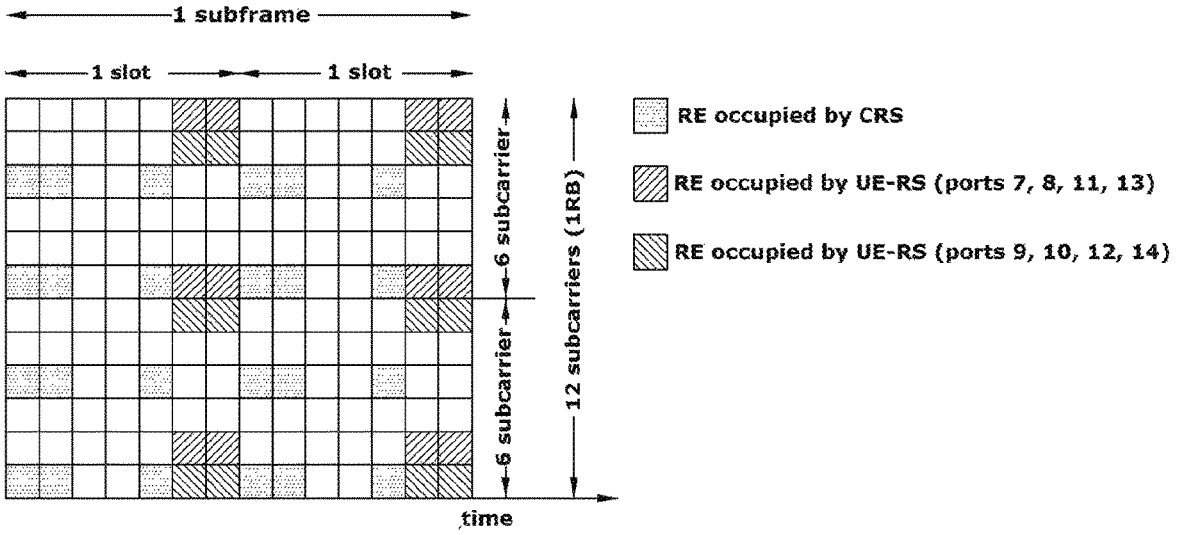
FIG. 15 is a view illustrating an exemplary subframe to which UE-specific Reference Signals (UE-RSs) are allocated, which may be used in embodiments of the present disclosure.

FIG. 15 illustrates an example of a subframe to which UE-RSs are allocated, which may be used in embodiments of the present disclosure.

Referring to FIG. 15, the subframe illustrates REs occupied by UE-RSs among REs in one RB of a normal DL subframe having a normal CP.

UE-RSs are transmitted on antenna port(s) $p=5$, $p=7$, $p=8$ or $p=7, 8, \ldots, \nu+6$ for PDSCH transmission, where $\nu$ is the number of layers used for the PDSCH transmission. UE-RSs are present and are a valid reference for PDSCH demodulation only if the PDSCH transmission is associated with the corresponding antenna port. UE-RSs are transmitted only on RBs to which the corresponding PDSCH is mapped.

The UE-RSs are configured to be transmitted only on RB(s) to which a PDSCH is mapped in a subframe in which the PDSCH is scheduled unlike CRSs configured to be transmitted in every subframe irrespective of whether the PDSCH is present. Accordingly, overhead of the RS may decrease relative to overhead of the CRS.

In the 3GPP LTE-A system, the UE-RSs are defined in a PRB pair. Referring to FIG. 15, in a PRB having frequency-domain index nPRB assigned for PDSCH transmission with respect to $p=7$, $p=8$, or $p=7, 8, \ldots, \nu+6$, a part of UE-RS sequence $r(m)$ is mapped to complex-valued modulation symbols.

UE-RSs are transmitted through antenna port(s) corresponding respectively to layer(s) of a PDSCH. That is, the number of UE-RS ports is proportional to a transmission rank of the PDSCH. Meanwhile, if the number of layers is 1 or 2, 12 REs per RB pair are used for UE-RS transmission and, if the number of layers is greater than 2, 24 REs per RB pair are used for UE-RS transmission. In addition, locations of REs occupied by UE-RSs (i.e. locations of UE-RS REs) in a RB pair are the same with respect to a UE-RS port regardless of a UE or a cell.

As a result, the number of DM-RS REs in an RB to which a PDSCH for a specific UE in a specific subframe is mapped is the same per UE-RS ports. Notably, in RBs to which the PDSCH for different UEs in the same subframe is allocated, the number of DM-RS REs included in the RBs may differ according to the number of transmitted layers.

The UE-RS can be used as the DM-RS in the embodiments of the present disclosure.

Sounding Reference Signal (SRS)

A sounding reference signal (SRS) is mainly used for an eNode B to perform a frequency-selective scheduling in UL in a manner of measuring a channel quality and the SRS is not related to a UL data and/or a control information transmission. Yet, this is just exemplary. The SRS can also be used to enhance power control or to support various start-up functions of UEs, which are not recently scheduled. For instance, the start-up function may include an initial modulation and coding scheme (MCS), an initial power control to transmit a data, timing alignment, frequency-semi selective scheduling (a frequency resource is selectively allocated in a first slot in a subframe and a frequency resource is pseudo-randomly hopped to a different frequency in a second slot), and the like.

And, the SRS can be used for a channel quality measurement under an assumption that a radio channel is reciprocal between UL and DL. The assumption is specifically effective in a time division duplex (TDD) system that the UL and the DL share an identical frequency band and are distinguished from each other in time domain.

A subframe to which an SRS is transmitted by a random UE in a cell is indicated by a cell-specific broadcast signaling. A cell-specific parameter of 4-bit 'SrsSubframeConfiguration' indicates 15 available configurations of a subframe to which an SRS is capable of being transmitted in each radio frame. By the help of the configurations, flexibility capable of controlling an SRS overhead can be provided according to a network arrangement scenario. The configuration of a last one ($16^{th}$) of the parameter corresponds to completely switching-off of an SRS transmission in a cell. For instance, the switching-off configuration may be suitable for a cell for serving a fast UEs.

Figure 16:
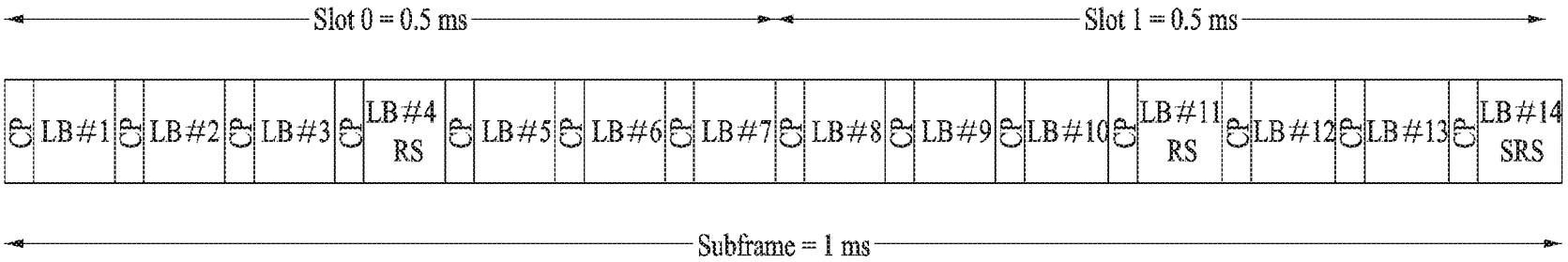
FIG. 16 is a diagram for explaining a sounding reference signal.

As depicted in FIG. 16, an SRS is always transmitted in a last SC-FDMA symbol of a configured subframe. Hence, the SRS and a demodulation reference signal (DMRS) are positioned at a SC-FDMA symbol different from each other. PUSCH data transmission is not allowed in the SC-FDMA symbol designated to transmit an SRS. Hence, in case that a sounding overhead is severest (i.e., in case that the SRS transmission symbol exists in all subframes), the sounding overhead is not over about 7%.

Each of the SRS symbols is generated by a base sequence (a random sequence or a ZC (Zadoff-Chu)-based sequence set) in a given time unit and a frequency band and all UEs in a cell use an identical base sequence. In this case, SRS transmissions from a plurality of UEs in a cell in an identical time unit and an identical frequency band are orthogonally distinguished by a different cyclic shift of the base sequence assigned to a plurality of the UEs. An SRS sequence of a different cell can be distinguished by assigning a different base sequence to each cell. Yet, orthogonality between different base sequences is not secured.

2.5 Enhanced PDCCH (EPDCCH)

In the 3GPP LTE/LTE-A system, Cross-Carrier Scheduling (CCS) in an aggregation status for a plurality of component carriers (CC: component carrier=(serving) cell) will be defined. One scheduled CC may previously be configured to be DL/UL scheduled from another one scheduling CC (that is, to receive DL/UL grant PDCCH for a corresponding scheduled CC). At this time, the scheduling CC may basically perform DL/UL scheduling for itself. In other words, a search space (SS) for a PDCCH for scheduling scheduling/scheduled CCs which are in the CCS relation may exist in a control channel region of all the scheduling CCs.

Meanwhile, in the LTE system, FDD DL carrier or TDD DL subframes are configured to use first n (n<=4) OFDM symbols of each subframe for transmission of physical channels for transmission of various kinds of control information, wherein examples of the physical channels include a PDCCH, a PHICH, and a PCFICH. At this time, the number of OFDM symbols used for control channel transmission at each subframe may be delivered to the UE dynamically through a physical channel such as PCFICH or semi-statically through RRC signaling.

Figure 17:
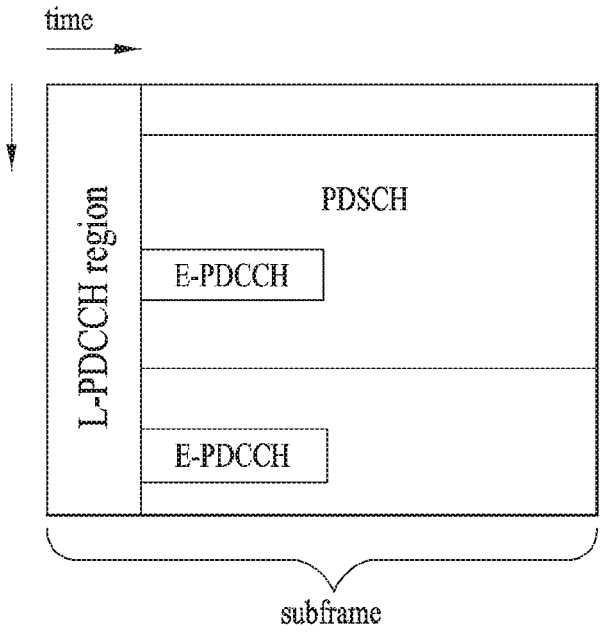
FIG. 17 is a view illustrating exemplary multiplexing of legacy Physical Downlink Control Channel (PDCCH), Physical Downlink Shared Channel (PDSCH), and Evolved-PDCCH (E-PDCCH) in an LTE/LTE-A system.

Meanwhile, in the LTE/LTE-A system, since a PDCCH which is a physical channel for DL/UL scheduling and transmitting various kinds of control information has a limitation that it is transmitted through limited OFDM symbols, enhanced PDCCH (i.e., E-PDCCH) multiplexed with a PDSCH more freely in a way of FDM/TDM may be introduced instead of a control channel such as PDCCH, which is transmitted through OFDM symbol and separated from PDSCH. FIG. 17 illustrates an example that legacy PDCCH, PDSCH and E-PDCCH, which are used in an LTE/LTE-A system, are multiplexed.

In the aforementioned system to which carrier aggregation is applied, a UE can receive a plurality of PDSCHs via a plurality of downlink carriers. In this case, the UE may transmit ACK/NACK for each data on a single UL CC in a single subframe. In case of transmitting a plurality of ACKs/NACKs in a single subframe using a PUCCH format 1a/1b, high transmit power is required, PAPR of uplink transmission increases, and a transmit power amplifier can be inefficiently used. As a result, a transmission distance from an eNB can be decreased. In order to transmit a plurality of the ACKs/NACKs via a single PUCCH, it may apply ACK/NACK bundling or ACK/NACK multiplexing.

And, ACK/NACK information on a plurality of downlink data according to the application of the carrier aggregation and/or ACK/NACK information on a plurality of downlink data transmitted in a plurality of DL subframes in a TDD system can be transmitted via PUCCH in a single subframe. In this case, if the number of ACK/NACK bits to be transmitted is greater than the number of ACK/NACK bits capable of being supported by ACK/NACK bundling or ACK/NACK multiplexing, it is difficult to properly transmit ACK/NACK information using the aforementioned methods.

ACK/NACK Multiplexing Scheme

In case of ACK/NACK multiplexing, ACK/NACK response contents on a plurality of data units can be identified by a combination of an ACK/NACK unit used for practically transmitting an ACK/NACK and symbols modulated by QPSK scheme. For instance, assume that one ACK/NACK unit carries information of 2-bit long and receives maximum 2 data units. In this case, assume that HARQ confirmation response for each of the received data units is represented by one ACK/NACK bit. In this case, a transmitting end, which has transmitted a data, can identify an ACK/NACK result as shown in a following Table 9.

TABLE 9

| HARQ-ACK(0), HARQ-ACK(0) | $n_{PUCCH}^{(1)}$ | b(0), b(1) |
|---|---|---|
| ACK, ACK | $n_{PUCCH,1}^{(1)}$ | 1, 1 |
| ACK, NACK/DTX | $n_{PUCCH,0}^{(1)}$ | 0, 1 |
| NACK/DTX, ACK | $n_{PUCCH,1}^{(1)}$ | 0, 0 |
| NACK/DTX, NACK | $n_{PUCCH,1}^{(1)}$ | 1, 0 |
| NACK, DTX | $n_{PUCCH,0}^{(1)}$ | 1, 0 |
| DTX, DTX | N/A | N/A |

Referring to Table 9, HARQ-ACK(i) (i=0, 1) indicates the ACK/NACK result for a data unit i. As mentioned earlier, since it is assumed that the maximum 2 data units (data unit 0 and data unit 1) are received, ACK/NACK result for the data unit 0 is represented as HARQ-ACK(0) and the ACK/NACK result for the data unit 1 is represented as HARQ-ACK(1) in the Table 6. In the Table 6, discontinuous transmission (DTX) indicates that a data unit corresponding to the HARQ-ACK(i) is not transmitted or a receiving end cannot detect a presence of a data unit corresponding to the HARQ-ACK(i). And, $n_{PUCCH,x}^{(1)}$ indicates an ACK/NACK unit practically used for an ACK/NACK transmission. In case that maximum 2 ACK/NACK units exist, the ACK/NACK unit can be represented as $n_{PUCCH,0}^{(1)}$ and $n_{PUCCH,1}^{(1)}$. And, b(0) and b(1) indicate two bits transmitted by a selected ACK/NACK unit. A modulation symbol transmitted by the ACK/NACK unit is determined according to the b(0) and the b(1) bit.

For instance, in case that a receiving end successfully receives and decodes 2 data units (i.e., in case of ACK, ACK in the Table 6), the receiving end transmits two bits (1, 1) using the ACK/NACK unit $n_{PUCCH,1}^{(1)}$. Or, in case that the receiving end receives 2 data units, if the receiving end fails to decode (detect) a first data unit (i.e., data unit 0 corresponding to HARQ(0)) and successfully decodes a second data unit (i.e., data unit 1 corresponding to HARQ-ACK(1)) (i.e., in case of NACK/DTX, ACK in the Table 6), the receiving end transmits 2 bits (0, 0) using the ACK/NACK unit $n_{PUCCH,1}^{(1)}$.

As mentioned in the foregoing description, the ACK/NACK information on a plurality of the data unit can be transmitted using one ACK/NACK unit in a manner of linking or mapping a combination (i.e., combination of selecting either $n_{PUCCH,0}^{(1)}$ or $n_{PUCCH,1}^{(1)}$ and b(0), b(1)) of a selection of the ACK/NACK unit and an actual bit content of a transmitted ACK/NACK unit to actual ACK/NACK contents. The ACK/NACK multiplexing for the data unit greater than 2 can be easily implemented by extending a principle of the aforementioned ACK/NACK multiplexing.

In the aforementioned ACK/NACK multiplexing scheme, if at least one ACK basically exists for all data units, an NACK may be not distinguished from a DTX (in particular, as represented as NACK/DTX in Table 6, the NACK and the DTX can be coupled). It is because all ACK/NACK states (i.e. ACK/NACK hypotheses) capable of being occurred in case of separately representing the NACK and the DTX cannot be reflected by a combination of the ACK/NACK unit and the symbol modulated by QPSK scheme only. Meanwhile, if the ACK does not exist for all data units (i.e., if the NACK or the DTX exists for all data units), a definite NACK for indicating one definite NACK (i.e., an NACK distinguished from a DTX) can be defined among the HARQ-ACK(i). In this case, an ACK/NACK unit corresponding to a data unit for indicating the definite NACK can be reserved to transmit signals of a plurality of ACK/NACK.

Semi-Persistent Scheduling (SPS)

DL/UL SPS (semi-persistent scheduling) designates a UE that which subframes (subframe interval and offset) are in charge of SPS transmission/reception by an RRC (radio resource control) signaling first, and then performs actual activation and release of the SPS via PDCCH. In particular, although the UE receives the SPS by the RRC signaling, if the UE receives (i.e., receiving PDCCH of which an SPS C-RNTI is detected) PDCCH for informing of activation (or reactivation), the UE does not immediately perform an SPS TX/RX but perform an SPS operation according to the PDCCH. In particular, if the UE receives an SRS activation PDCCH, the UE allocates a frequency resource according to an RB assignment designated by the PDCCH, applies a modulation and a coding rate according to MCS information, and may begin to perform the TX/RX with the subframe interval and offset assigned by the RRC signaling. Meanwhile, if the UE receives PDCCH for informing of an SRS release, the UE stops the TX/RX. If the PDCCH for informing of activation (or reactivation) is received, the stopped SPS TX/RX can resume the TX/RX with the subframe and the offset assigned by the RRC signaling according to the RB assignment, MCS, and the like designated by the PDCCH.

The PDCCH format currently defined by 3GPP LTE includes such various formats as a DCI format 0 for an UL and DCI format 1, 1A, 1B, 1C, 1D, 2, 2A, 3, 3A, and the like for a DL. Such a control information as a hopping flag, RB allocation, an MCS (modulation coding scheme), an RV (redundancy version), an NDI (new data indicator), a TPC (transmit power control), a cyclic shift DMRS (demodulation reference signal), a UL index, a CQI (channel quality information) request, a DL assignment index, a HARQ process number, a TPMI (transmitted precoding matrix indicator), a PMI (precoding matrix indicator) confirmation, and the like is transmitted in a form of a combination of being selected in accordance with each usage.

More specifically, using a PDCCH as a usage of SPS scheduling activation/release can be validated in case that a CRS of a DCI transmitted on the PDCCH is masked with an SPS C-RNTI and an NDI is set to 0. In this case, in case of SPS activation, a virtual CRC is used in a manner of setting a combination of a bit field to 0 as depicted in Table 10.

TABLE 10

| | DCI format 0 | DCI format 1/1A | DCI format 2/2A/2B |
|---|---|---|---|
| TPC command for scheduled PUSCH | set to '00' | N/A | N/A |
| Cyclic shift DMRS | set to '000' | N/A | N/A |
| Modulation and coding scheme and redundancy version | MSB is set to '0' | N/A | N/A |
| HARQ process number | N/A | FDD: set to '000'<br>TDD: set to '0000' | FDD: set to '000'<br>TDD: set to '0000' |

TABLE 10-continued

| | DCI format 0 | DCI format 1/1A | DCI format 2/2A/2B |
|---|---|---|---|
| Modulation and coding scheme | N/A | MSB is set to '0' | For the enabled transport block: MSB is set to '0' |
| Redundancy version | N/A | set to '00' | For the enabled transport block: MSB is set to '00' |

When an error not capable of being checked by a CRC occurs, the virtual CRC is configured to have an ability of additional error detection in a manner of checking whether a corresponding bit field value is a promised value. When an error occurs a DCI assigned to a different UE, if a specific UE cannot detect the corresponding error and the UE incorrectly recognizes the error as an SPS activation of the UE, since the UE continuously uses a corresponding resource, one time error may cause a consistent problem. Hence, a wrong detection of an SRS can be avoided by the use of the virtual CRC.

In case of an SRS release, the virtual CRC can be used by setting a bit field value as depicted in Table 11.

TABLE 11

| | DCI format 0 | DCI format 1A |
|---|---|---|
| TPC command for scheduled PUSCH | set to '00' | N/A |
| Cyclic shift DMRS | set to '000' | N/A |
| Modulation and coding scheme and redundancy version | set to '11111' | N/A |
| Resource block assignment and hopping resource allocation | Set to all '1's | N/A |
| HARQ process number | N/A | FDD: set to '000'<br>TDD: set to '0000' |
| Modulation and coding scheme | N/A | setto '11111' |
| Redundancy version | N/A | set to '00' |
| Resource block assignment | N/A | set to all '1's |

3. LTE-U System 3.1 LTE-U System Configuration

Hereinafter, methods for transmitting and receiving data in a CA environment of an LTE-A band corresponding to a licensed band and an unlicensed band will be described. In the embodiments of the present disclosure, an LTE-U system means an LTE system that supports such a CA status of a licensed band and an unlicensed band. A WiFi band or Bluetooth (BT) band may be used as the unlicensed band.

Figure 18:
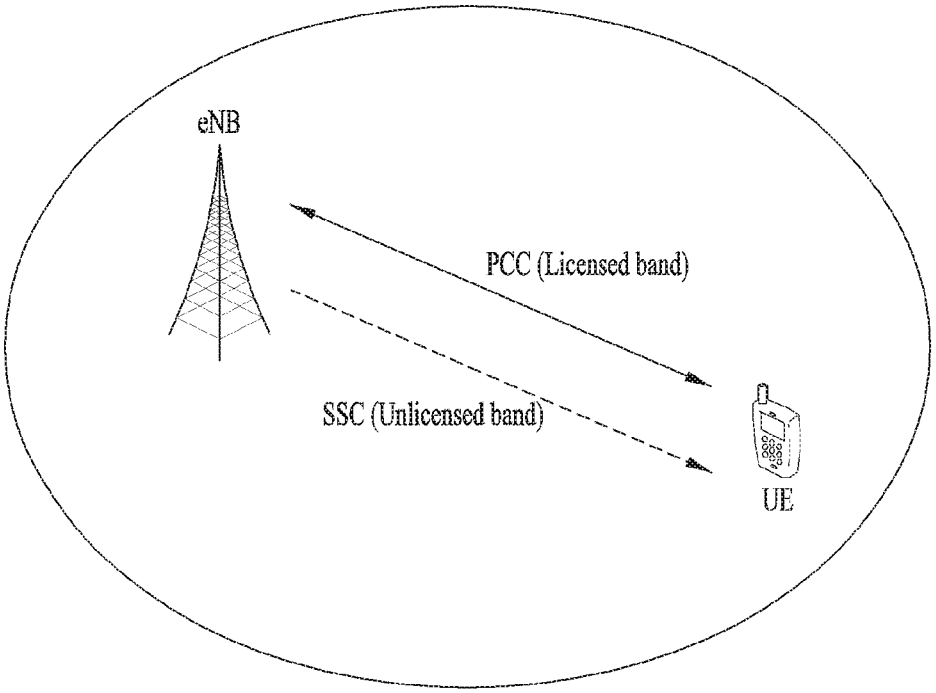
FIG. 18 is a view illustrating an exemplary CA environment supported in an LTE-Unlicensed (LTE-U) system.

FIG. 18 illustrates an example of a CA environment supported in an LTE-U system.

Hereinafter, for convenience of description, it is assumed that a UE is configured to perform wireless communication in each of a licensed band and an unlicensed band by using two CCs. The methods which will be described hereinafter may be applied to even a case where three or more CCs are configured for a UE.

In the embodiments of the present disclosure, it is assumed that a carrier of the licensed band may be a primary CC (PCC or PCell), and a carrier of the unlicensed band may be a secondary CC (SCC or SCell). However, the embodiments of the present disclosure may be applied to even a case where a plurality of licensed bands and a plurality of unlicensed bands are used in a carrier aggregation method. Also, the methods suggested in the present disclosure may be applied to even a 3GPP LTE system and another system.

In FIG. 18, one eNB supports both a licensed band and an unlicensed band. That is, the UE may transmit and receive control information and data through the PCC which is a licensed band, and may also transmit and receive control information and data through the SCC which is an unlicensed band. However, the status shown in FIG. 18 is only example, and the embodiments of the present disclosure may be applied to even a CA environment that one UE accesses a plurality of eNBs. *For example, the UE may configure a macro eNB (M-eNB) and a PCell, and may configure a small eNB (S-eNB) and an SCell. At this time, the macro eNB and the small eNB may be connected with each other through a backhaul network.*

[For example, the UE may configure a macro eNB (M-eNB) and a PCell, and may configure a small eNB (S-eNB) and an SCell. At this time, the macro eNB and the small eNB may be connected with each other through a backhaul network.] *Furthermore, embodiments of the present invention may be applied even when a UE transmits a signal to another UE or receives a signal from another UE through direct communication between UEs. Here, signal transmission and reception with other UEs may be referred to as device-to-device (D2D) or sidelink.*

In the embodiments of the present disclosure, the unlicensed band may be operated in a contention-based random access method. At this time, the eNB that supports the unlicensed band may perform a Carrier Sensing (CS) procedure prior to data transmission and reception. The CS procedure determines whether a corresponding band is reserved by another entity.

For example, the eNB of the SCell checks whether a current channel is busy or idle. If it is determined that the corresponding band is idle state, the eNB may transmit a scheduling grant to the UE to allocate a resource through (E)PDCCH of the PCell in case of a cross carrier scheduling mode and through PDCCH of the SCell in case of a self-scheduling mode, and may try data transmission and reception.

At this time, the eNB may configure a TxOP including N consecutive subframes. In this case, a value of N and a use of the N subframes may previously be notified from the eNB to the UE through higher layer signaling through the PCell or through a physical control channel or physical data channel. *A TxOP interval composed of M subframes may be referred to as a reserved resource period (RRP).*

3.2 Carrier Sensing (CS) Procedure

In embodiments of the present disclosure, a CS procedure may be called a Clear Channel Assessment (CCA) procedure. In the CCA procedure, it may be determined whether a channel is busy or idle based on a predetermined CCA threshold or a CCA threshold configured by higher-layer signaling. For example, if energy higher than the CCA threshold is detected in an unlicensed band, SCell, it may be determined that the channel is busy or idle. If the channel is determined to be idle, an eNB may start signal transmission in the SCell. This procedure may be referred to as LBT.

Figure 19:
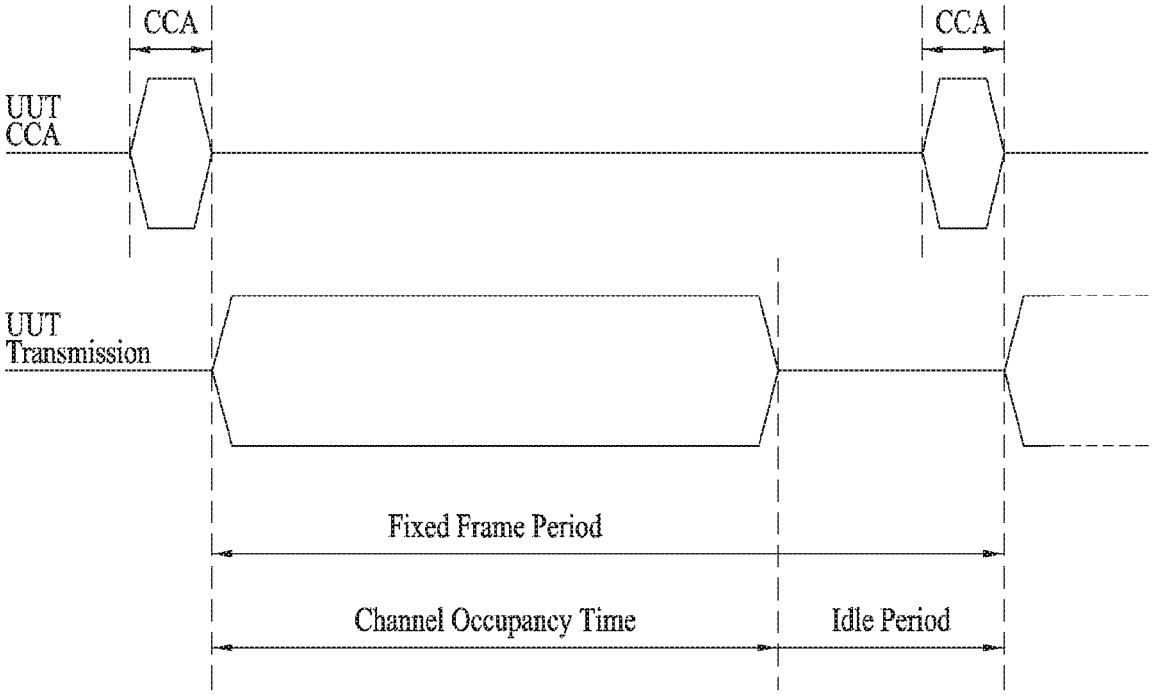
FIG. 19 is a view illustrating an exemplary Frame Based Equipment (FBE) operation as one of Listen-Before-Talk (LBT) operations.

FIG. 19 is a view illustrating an exemplary Frame Based Equipment (FBE) operation as one of LBT operations.

The European Telecommunication Standards Institute (ETSI) regulation (EN 301 893 V1.7.1) defines two LBT operations, Frame Based Equipment (FBE) and Load Based Equipment (LBE). In FBE, one fixed frame is comprised of a channel occupancy time (e.g., 1 to 10 ms) being a time period during which a communication node succeeding in channel access may continue transmission, and an idle period being at least 5% of the channel occupancy time, and CCA is defined as an operation for monitoring a channel during a CCA slot (at least 20 μs) at the end of the idle period.

A communication node periodically performs CCA on a per-fixed frame basis. If the channel is unoccupied, the communication node transmits data during the channel occupancy time. On the contrary, if the channel is occupied, the communication node defers the transmission and waits until the CCA slot of the next period.

Figure 20:
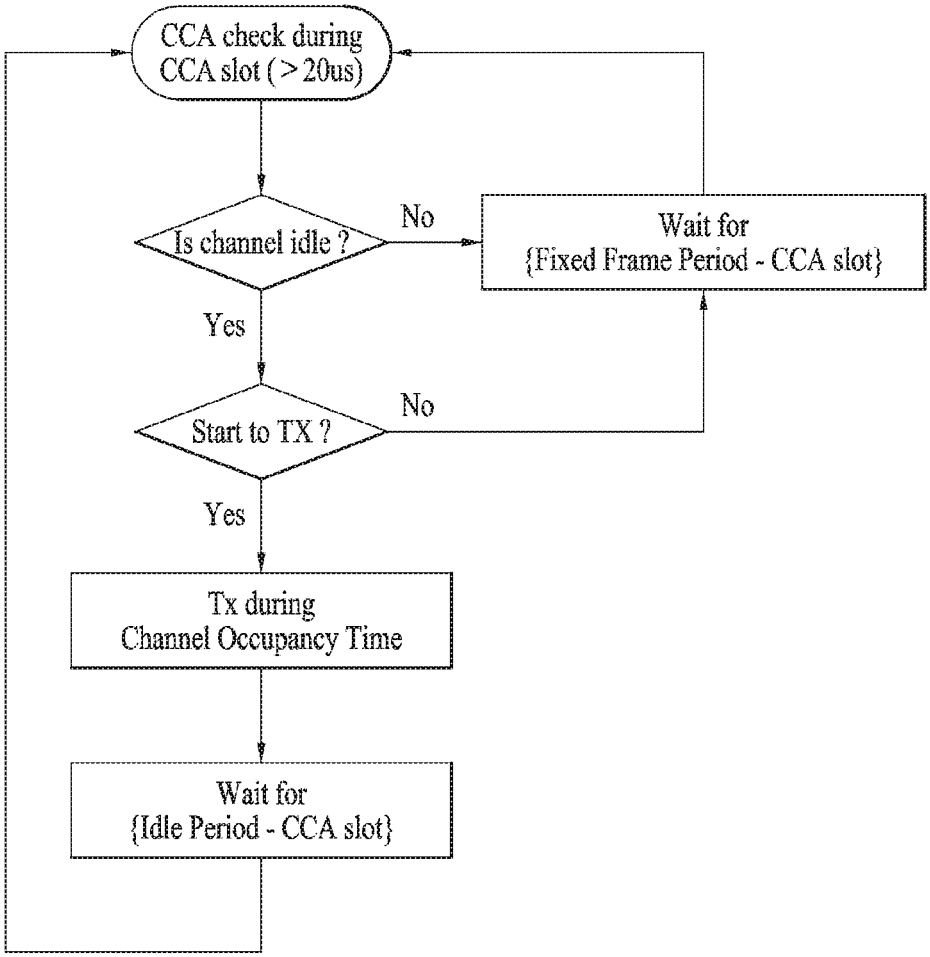
FIG. 20 is a block diagram illustrating the FBE operation.

FIG. 20 is a block diagram illustrating the FBE operation.

Referring to FIG. 20, a communication node (i.e., eNB) managing an SCell performs CCA during a CCA slot. If the channel is idle, the communication node performs data transmission (Tx). If the channel is busy, the communication node waits for a time period calculated by subtracting the CCA slot from a fixed frame period, and then resumes CCA.

The communication node transmits data during the channel occupancy time. Upon completion of the data transmission, the communication node waits for a time period calculated by subtracting the CCA slot from the idle period, and then resumes CCA. If the channel is idle but the communication node has no transmission data, the communication node waits for the time period calculated by subtracting the CCA slot from the fixed frame period, and then resumes CCA.

Figure 21:
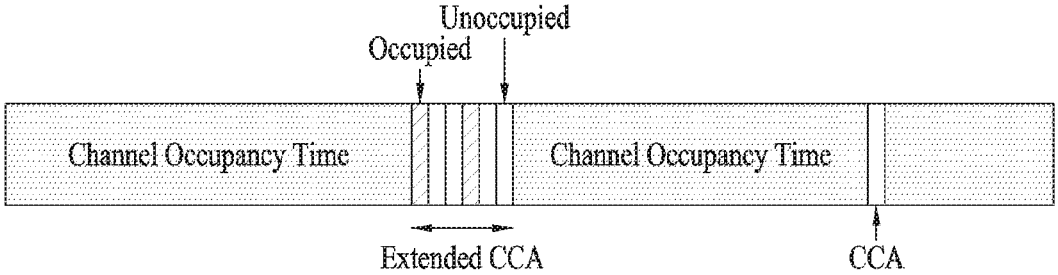
FIG. 21 is a view illustrating an exemplary Load Based Equipment (LBE) operation as one of the LBT operations.
Figure 21:
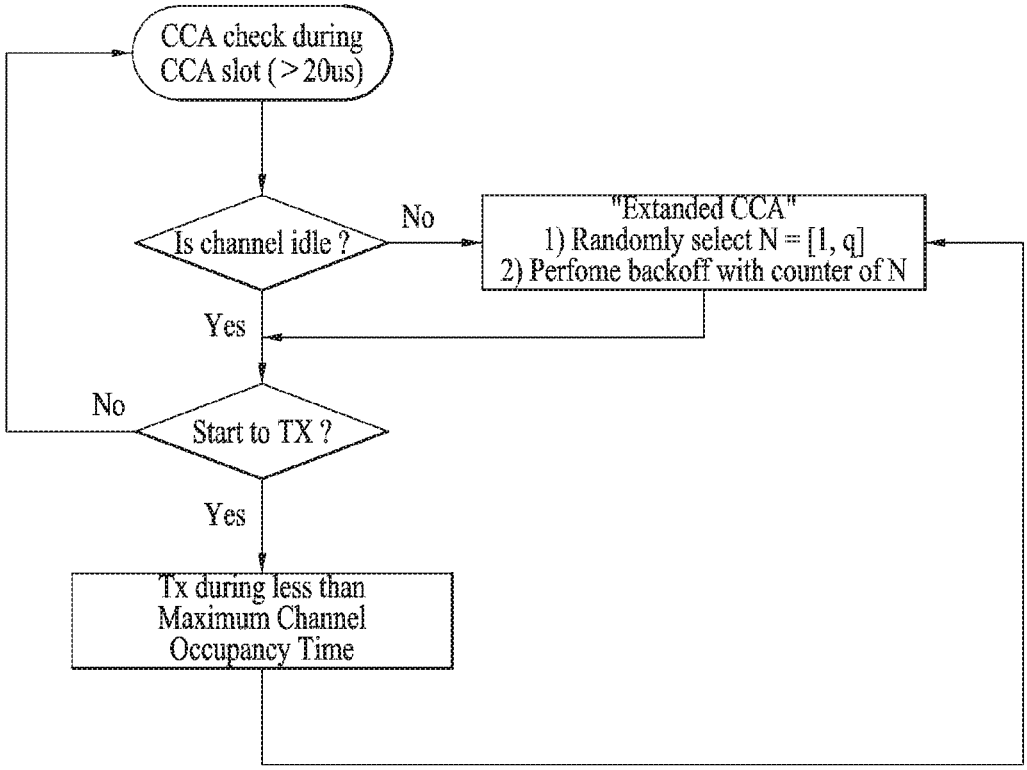

FIG. 21 is a view illustrating an exemplary LBE operation as one of the LBT operations.

Referring to FIG. 21(a), in LBE, the communication node first sets q ($q \in \{4, 5, \ldots, 32\}$) and then performs CCA during one CCA slot.

FIG. 21(b) is a block diagram illustrating the LBE operation. The LBE operation will be described with reference to FIG. 21(b).

The communication node may perform CCA during a CCA slot. If the channel is unoccupied in a first CCA slot, the communication node may transmit data by securing a time period of up to (13/32)q ms.

On the contrary, if the channel is occupied in the first CCA slot, the communication node selects N ($N \in \{1, 2, \ldots, q\}$) arbitrarily (i.e., randomly) and stores the selected N value as an initial count. Then, the communication node senses a channel state on a CCA slot basis. Each time the channel is unoccupied in one specific CCA slot, the communication node decrements the count by 1. If the count is 0, the communication node may transmit data by securing a time period of up to (13/32)q ms.

4. Method of Selecting UL Resource in Unlicensed Band

In the following, when a channel is determined as idle after the aforementioned CS (i.e., LBT) procedure is performed, methods of scheduling a UL resource are explained. In this case, if an SCell on which the carrier sensing is performed is determined as idle, it indicates that the Scell is repeatedly determined as idle as many as a backoff counter in the LBT procedure or the backoff procedure in the embodiments of the present invention. In particular, if the Scell is in the idle state, it indicates that the carrier sensing including the backoff procedure and the LBT procedure is completed and the Scell is finally in the idle state.

In the embodiments of the present invention, for clarity, assume that a size M of a TxOP period corresponds to 3 (i.e., 3 subframes). And, assume that a Pcell operates in LTE-A system corresponding to a licensed band and the Scell operates in an unlicensed band (e.g., WiFi, BT, etc.). For details, it may refer to FIG. 18.

As mentioned in the foregoing description, an eNB performs the aforementioned LBT and/or the random backoff procedure to determine whether or not a currently using channel is idle. If the channel is determined as idle, the eNB transmits a scheduling grant to a UE via (E)PDCCH of the PCell (cross-carrier scheduling scheme) or (E)PDCCH of the Scell (self-scheduling scheme) to allocate a resource and may be then able to attempt to transmit and receive data.

In general, an eNB designates a resource to be used by a UE for transmission in uplink. This is intended to avoid a collision of data signals transmitted by a plurality of UEs. For example, if the eNB designates a resource to be used for uplink transmission via a control signal (UL grant), the UE performs uplink transmission according to the designated resource. In general, in order for the UE to initiate transmission after a control signal is received, it is required for the UE to have prescribed processing time. In order to guarantee the processing time, LTE regulates uplink transmission in a subframe #n according to a UL grant to be performed in a subframe #n+4 or later. By doing so, it may be able to guarantee processing time equal to or longer than 3 ms.

Meanwhile, in case of D2D, although an eNB is able to designate a D2D transmission resource to an individual UE to follow the same principle, since it is not necessary for the eNB to receive a D2D signal and in order to make UEs autonomously determine D2D transmission/reception, the eNB can configure a prescribed resource pool in advance and a UE can select a resource to be used by the UE from the resource pool. This is referred to as UE autonomous resource selection.

When a UE transmits a signal on a specific unlicensed band, a UL grant-based operation operated on a licensed band may not be preferable. The UE can transmit a signal only when a channel is idle. This is because the channel state may change (idle/busy) during processing time between the UL grant and actual transmission and it is difficult for an eNB to identify or predict the channel state in the aspect of the UE. Hence, the UE autonomous resource selection can be more efficient on an unlicensed band. According to the UE autonomous resource selection, a transmission resource is autonomously determined by a UE instead of being designated by the eNB.

In the following, the UE autonomous resource selection, which is proposed by the present invention, on an unlicensed band is explained in detail.

4.1 UE Autonomous Resource Selection Method when UE Accesses eNB

A UE receives information on a resource selection area from an eNB and may be able to autonomously select a resource for performing UL transmission from the resource selection area only.

The eNB can designate a resource area to the UE to make the UE autonomously select a resource without receiving a grant. In the following, the resource area designated by the eNB is referred to as a resource selection area.

When the UE autonomously performs resource selection, it may indicate that the UE selects a resource without receiving a grant from the eNB and transmits data via the selected resource. In this case, the grant received from the eNB corresponds to a message for designating an accurate time/frequency resource to be used by a specific UE for transmission. In this case, the UE can directly generate or select a grant to select a resource from the resource selection area.

In this case, carrier sensing and/or random backoff can be applied to the resource selection area. If it is determined as a corresponding cell is in an idle state via the carrier sensing, a UE autonomously selects a resource of the cell to perform UL transmission. For example, assume that a part of frequency resources is used only. In this case, if it is determined as the cell is in an idle state, the UE may select an appropriate frequency to transmit data.

A resource selection area can be configured in consideration of a transmission/reception status of a UE or an eNB. As an example, assume a case that a UE accesses a specific eNB on an unlicensed band and the UE is able to receive a downlink data from the eNB. In this case, if the UE transmits a signal at the timing which is configured as a DL usage of the eNB, it may cause severe interference to a different UE receiving a corresponding DL signal. Hence, the UE can be configured not to perform UL transmission in an area in which a serving eNB performs DL transmission. Hence, a UE autonomous resource selection area can be configured in consideration of the DL transmission of the eNB.

In the following, a method of configuring a resource selection area is explained in detail.

4.1.1 Configuration of Resource Selection Area

It may set a limit on a time/frequency domain at which UE autonomous resource selection may occur. In this case, an eNB can configure a UE autonomous resource selection area using an RRP configuration. In particular, when the eNB configures the UE autonomous resource selection area, it can be performed as a part of the RRP configuration.

For example, the eNB can designate a specific area corresponding to a part of an RRP as the resource selection area. The eNB can inform UEs of an area where the UE autonomous resource selection is to be performed among the RRP. Then, a UE performs the UE autonomous resource selection in the area whenever an individual RRP is configured.

Specifically, a relative location of the UE autonomous resource selection area is fixed in an RRP. However, the area may have a flexible characteristic depending on an RRP configuration in the aspect of the total resources. In particular, the characteristic is effective when the RRP configuration also appears aperiodically because a channel idle timing is unpredictable.

Figure 22:
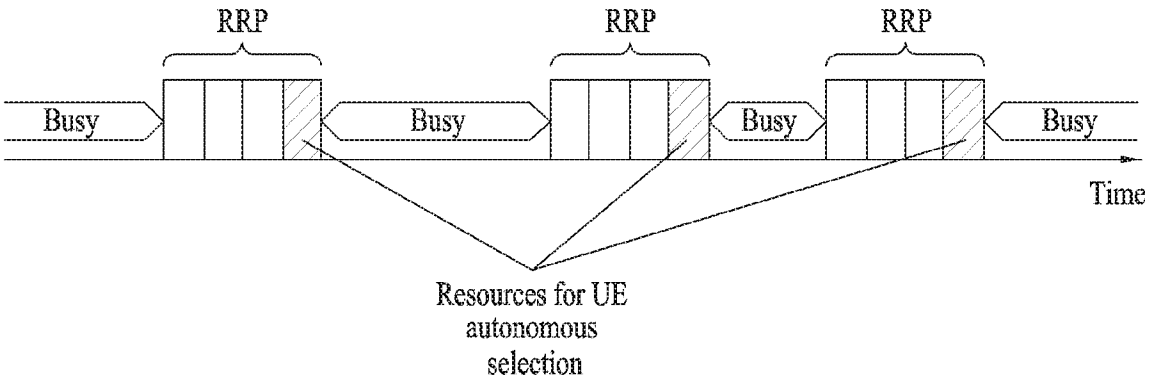
FIG. 22 is a diagram for explaining a method for a UE to perform autonomous resource selection according to one embodiment of the present invention.

FIG. 22 is a diagram for explaining a method for a UE to perform autonomous resource selection according to one embodiment of the present invention.

In this case, a length of an RRP is configured by 4 subframes by the eNB and the last subframe is configured as the area at which the UE autonomous resource selection is performed. For clarity, assume a case that a backoff procedure is omitted and an RRP is immediately configured when a channel is idle.

Referring to FIG. 22, a channel idle timing is flexible. As a result, timing at which an RRP appears and timing (the last subframe of the RRP) at which the UE autonomous resource selection is available are also flexible.

In this case, a UE receives RRP configuration information and/or information on a resource selection area configured in the RRP from an eNB and may be able to transmit data in the resource selection area based on the autonomous resource selection.

As mentioned in the foregoing description, the UE receives the information on the resource selection area configured in the RRP from the eNB and can perform carrier sensing on the resource selection area. In particular, the UE can perform the carrier sensing on the last subframe of the RRP to select a resource. If it is determined as a corresponding channel is in an idle state, the UE selects a resource in the channel and may be then able to transmit data via the selected resource.

The embodiment of FIG. 22 shows a case that a location and a size of the resource selection area are fixed in the RRP, by which the present invention may be non-limited. Specifically, in order to more flexibly allocate a resource, the eNB can designate the location and the size of the resource selection area dynamically, e.g., in every RRP.

Figure 23:
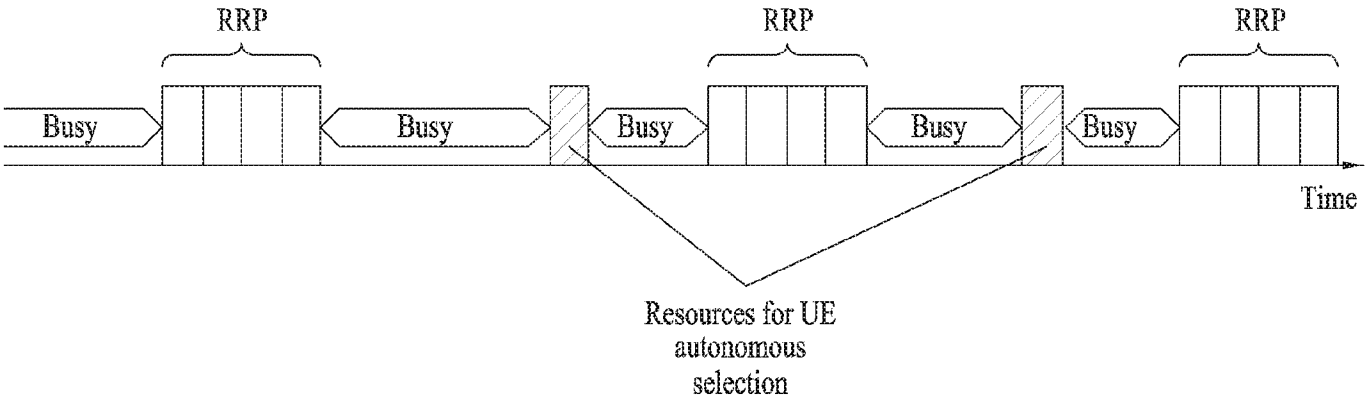
FIG. 23 is a diagram for explaining a method for a UE to perform autonomous resource selection according to a different embodiment of the present invention.

FIG. 23 is a diagram for explaining a method for a UE to perform autonomous resource selection in a resource area rather than an RRP.

According to the present invention, a resource selection area for autonomous resource selection can be set to an area rather than an RRP. In this case, it may be able to configure a UE not to perform the UE autonomous resource selection in the RRP irrespective of whether a corresponding subframe is DL or UL and it is able to configure transmission transmitted by the UE autonomous resource selection to be performed at an area outside of the RRP. This method has a merit in that the RRP is utilized for eNB scheduling-based resource utilization as much as possible.

Referring to FIG. 23, a resource selection area can be set to all areas except an RRP. In this case, an eNB can transmit information on the resource selection area indicating that the resource selection area corresponds to an area other than the RRP. Or, the resource selection area can be set to a specific area except the RRP. Similarly, the eNB can transmit information on the resource selection area indicating that the resource selection area corresponds to the specific area among areas other than the RRP.

The UE can perform the autonomous resource selection in an area other than the RRP according to the information on the resource selection area. Referring to FIG. 23, the UE transmits a signal based on the autonomous resource selection in a resource area of an idle state between the RRP and a next RRP.

Yet, although the UE transmits a signal at the outside of the RRP, it may configure time/frequency synchronization including a subframe boundary to follow synchronization of a serving eNB. Besides, various transmission parameters, e.g., a parameter for generating a DM-RS sequence, a parameter for determining transmit power of a signal transmitted by the UE, a timing advance value to be applied to UE transmission, and the like, can be operated using a value indicated by the eNB.

And, when UEs transmit a signal at the outside of the RRP, it may be able to configure the UEs to perform LBT and/or random backoff depending on a regulation. In this case, a UE can select a resource and transmit a signal only when a channel is idle after the LBT and/or the random backoff is performed.

In particular, having received the information on the resource selection area, the UE can perform carrier sensing on an area other than the RRP according to the information. If it is determined a channel is in an idle state via the carrier sensing, the UE autonomously selects a resource for the channel and may be able to perform data transmission.

Meanwhile, since an operation of transmitting a signal at the outside of the RRP is more appropriate for transmitting a D2D signal, which is not necessary for an eNB to receive, the operation can be restrictively applied to D2D signal transmission. Referring to FIG. 23, if a channel becomes idle between an RRP and a next RRP, the UE can transmit a signal based on autonomous resource selection.

4.1.2 Restriction on Resource Selection Area 4.1.2.1 Restriction on Resource Selection Duration When the UE autonomous resource selection is performed in an area other than an RRP, if transmission of a UE is performed for excessively long time, an opportunity for an eNB to transmit a signal is reduced. In order to prevent this, the eNB can set a limit on a period in which the UE autonomous resource selection is permitted. For example, the eNB can set a limit on the period in which the UE autonomous resource selection is permitted by setting a limit on resource selection duration.

For example, the eNB determines a time length which is maintained when the UE autonomous resource selection is performed and may be then able to inform UEs of the determined time length. Having received the time length, once the UE autonomous resource selection is initiated at an area other than the RRP, it may be able to configure the UEs to select a resource before the time length is expired. In particular, a resource selection area may correspond to an area within a prescribed time after the autonomous resource selection is performed at an area other than the RRP.

In this case, time at which the autonomous resource selection is initiated may correspond to time at which resource selection is performed after a channel is determined as idle.

Meanwhile, in the aspect of a specific UE, a restriction on resource selection duration may correspond to a restriction on time capable of transmitting a signal. This is because it is necessary for a UE to select a resource for signal transmission from a resource selection area of a prescribed size. In particular, when UE autonomous resource selection is performed, an eNB determines a time length during which resource selection is maintained and can inform UEs of the determined time length. Having received the time length, once the UE autonomous resource selection is initiated, the UEs can transmit a signal before the time length is expired. In particular, time capable of transmitting a signal of a UE may correspond to an area within a prescribed time after the autonomous resource selection is performed in an area rather than RRP.

4.1.2.2 Restriction on Size of Resource Selection Area

When the UE autonomous resource selection is performed in an area other than an RRP, if transmission of a UE is performed for excessively long time, an opportunity for an eNB to transmit a signal is reduced. In order to prevent this, the eNB can set a limit on a size of a resource selection area to set a limit on a period in which the UE autonomous resource selection is permitted.

For example, the eNB can inform the UE of a period in which the UE autonomous resource selection is performed in a manner of interlocking the period with an RRP configuration of the eNB. As a specific example, if an RRP configured by the eNB ends at a timing t, the eNB can configure the UE autonomous resource selection to be permitted between a timing t+a and a timing t+b only. In this case, the a and the b can be configured by a value equal to or greater than 0, respectively. If the a is configured by 0, the resource selection area starts at a timing at which the RRP ends. In particular, if time b is elapsed after the RRP is terminated, transmission of the UE based on the UE autonomous resource selection is disabled. As a result, the eNB is able to easily configure a next RRP of the eNB. Similarly, in the aspect of a specific UE, it may be able to configure the UE to transmit a signal between the timing t+a and the timing t+b only.

Of course, although an area in which the UE autonomous resource selection is available is determined by the restriction, whether or not an individual UE is able to perform transmission via the UE autonomous resource selection may vary depending on whether an actual channel is idle or busy.

4.1.3. Restriction on Backoff or LBT

In addition, when the UE autonomous resource selection is performed, it may be able to configure an RRP set by the eNB to preferentially occupy a channel by putting a restriction on LBT or random backoff.

For example, in case of performing the UE autonomous resource selection, it may be able to configure a UE to transmit a signal only when a channel is continuously idle during prescribed time X seconds. If it is able to configure the eNB to transmit a signal before the X seconds are elapsed, the eNB can initiate transmission of the eNB before UE transmission is performed based on the UE autonomous resource selection.

Similarly, when the UE autonomous resource selection is performed, if an initial range of a random backoff counter is configured to have a value relatively bigger than an initial value of the random backoff counter, it may have a similar effect.

4.2 UE Autonomous Resource Selection Method when UE does not Access eNB

A UE may operate in a state that the UE does not access an eNB on an unlicensed band. In this case, since the UE does not have a serving eNB on the unlicensed band, a signal transmitted by the UE may correspond to a D2D signal received by a different UE. In this case, since a serving eNB does not exist, it may be able to perform the UE autonomous resource selection based on LBT and/or random backoff without any restriction.

Yet, when synchronization including a subframe boundary is performed, if the synchronization is configured according a reference provided by a network via a licensed band, a plurality of UEs can match synchronization with each other. For example, it may be able to configure the synchronization using a subframe boundary of a serving eNB existing on a licensed band. By doing so, it may be able to obtain an effect of matching a subframe boundary between UEs.

4.2.1 UE Autonomous Resource Selection Method when there is Different Operator

Meanwhile, when there is no serving eNB on an unlicensed band, it may be able to detect a different eNB, e.g., an eNB installed by an operator to which a corresponding UE does not subscribe. In this case, it may put a restriction on the UE autonomous resource selection.

Specifically, in order to protect DL and UL signals in an RRP of the detected eNB, signal transmission via the UE autonomous resource selection can be restricted in an RRP configured by a different eNB as well. In particular, although a UE detects an idle channel via carrier sensing, if a corresponding period corresponds to a period belonging to the RRP of the different eNB, the UE stops transmitting a signal.

In this case, in order to put a restriction on the UE autonomous resource selection, an eNB of a different operator can be configured to satisfy a condition described in the following.

In particular, since it is not necessary to protect an RRP of a different eNB sufficiently apart from the UE, UE transmission can be restricted in the RRP of the different eNB only when signal quality (e.g., RSRP or RSRQ) of the different eNB is equal to or greater than a prescribed level.

An eNB can determine the signal quality level on the basis of a resource cooperation level with a different eNB and the eNB can inform a UE of the determined signal quality level. In this case, since it is necessary for the UE to detect a signal of an eNB of a different operator to determine whether to configure an RRP, the UE can receive corresponding information from a serving eNB located on a licensed band.

The information can include a cell ID of a different operator located on an unlicensed band and information (e.g., a parameter for generating a reference signal, a preamble, a synchronization signal, and a discovery signal) necessary for detecting signals transmitted by eNBs of the different operator.

The aforementioned operation of terminating signal transmission in an RRP of a neighboring eNB can also be applied to a case that a UE has a serving eNB on an unlicensed band. The operation is especially helpful when the serving eNB and the neighboring eNB have determined to protect a mutual RRP in advance.

However, an operation of protecting an RRP may not be necessary for an eNB which has not established a cooperation relation. Hence, an eNB can inform a UE of an RRP of an eNB in which signal transmission based on the UE autonomous resource selection is to be terminated via higher layer signal in advance. In this case, if a transmission condition is satisfied by LBT and/or random backoff in an RRP of a different neighboring eNB, it may be able to configure the UE to transmit a signal in the RRP.

5. Apparatuses

Figure 24:
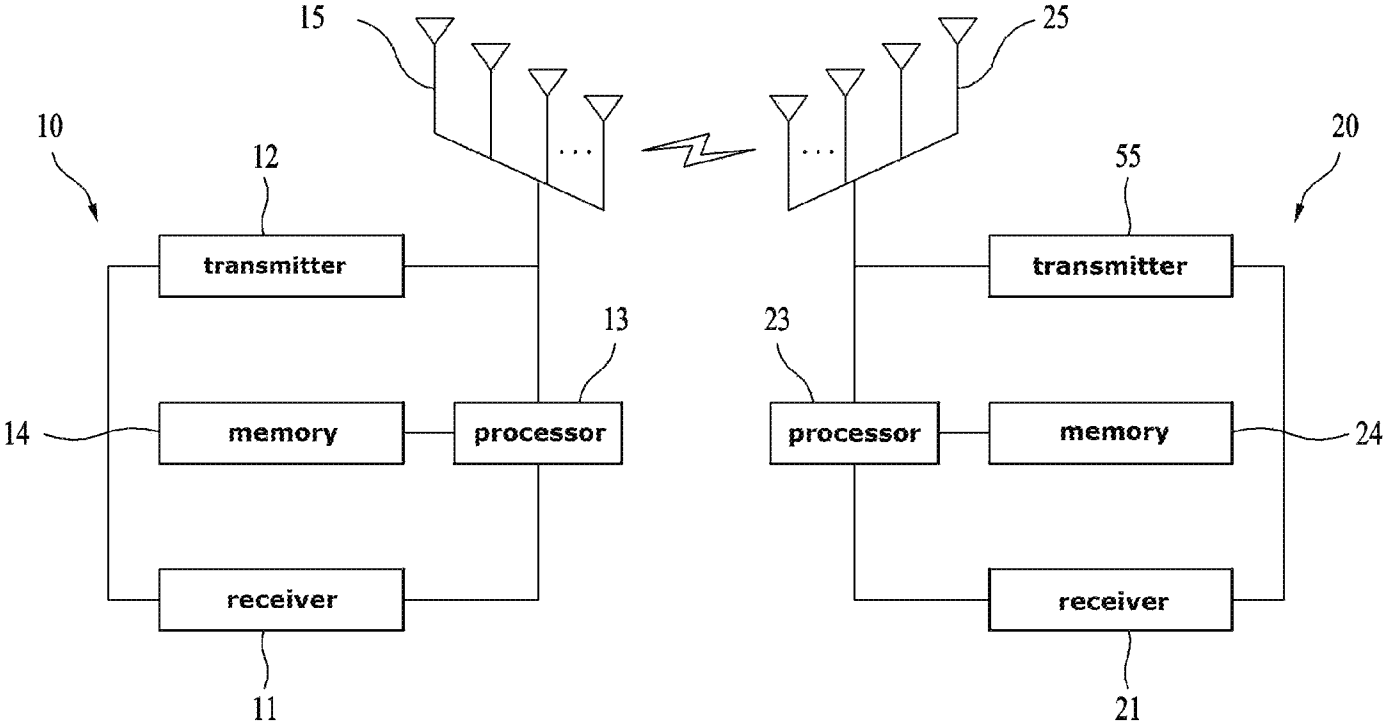
FIG. 24 is a block diagram of apparatuses for implementing the methods illustrated in FIGS. 1 to 23.

Apparatuses illustrated in FIG. 24 are means that can implement the methods described before with reference to FIGS. 1 to 23.

A UE may act as a transmission end on a UL and as a reception end on a DL. An eNB may act as a reception end on a UL and as a transmission end on a DL.

That is, each of the UE and the eNB may include a Transmitter (Tx) 12 or 22 and a Receiver (Rx) 11 or 21, for controlling transmission and reception of information, data, and/or messages, and an antenna 15 or 25 for transmitting and receiving information, data, and/or messages.

Each of the UE and the eNB may further include a processor 13 or 23 for implementing the afore-described embodiments of the present disclosure and a memory 14 or 24 for temporarily or permanently storing operations of the processor 13 or 23.

The embodiments of the present invention can be performed using the component elements and functions of the UE and the eNB. For example, the eNB is able to check whether or not an Scell is in an idle state by performing backoff and CS. If the Scell is in the idle state, the eNB can transmit and receive data by setting TxOP or an RRP. The eNB can configure an area belonging to the RRP or an area rather than the RRP as a resource selection area for UE autonomous resource selection. The UE receives RRP configuration information and/or configuration information on the resource selection area from the eNB and may be then able to perform autonomous resource selection based on the information. The autonomous resource selection can be performed based on CS. The UE can transmit and receive data in a resource area selected via the autonomous resource selection.

The Tx and Rx of the UE and the eNB may perform a packet modulation/demodulation function for data transmission, a high-speed packet channel coding function, OFDM packet scheduling, TDD packet scheduling, and/or channelization. Each of the UE and the eNB of FIG. 24 may further include a low-power Radio Frequency (RF)/Intermediate Frequency (IF) module.

Meanwhile, the UE may be any of a Personal Digital Assistant (PDA), a cellular phone, a Personal Communication Service (PCS) phone, a Global System for Mobile (GSM) phone, a Wideband Code Division Multiple Access (WCDMA) phone, a Mobile Broadband System (MBS) phone, a hand-held PC, a laptop PC, a smart phone, a Multi Mode-Multi Band (MM-MB) terminal, etc.

The smart phone is a terminal taking the advantages of both a mobile phone and a PDA. It incorporates the functions of a PDA, that is, scheduling and data communications such as fax transmission and reception and Internet connection into a mobile phone. The MB-MM terminal refers to a terminal which has a multi-modem chip built therein and which can operate in any of a mobile Internet system and other mobile communication systems (e.g. CDMA 2000, WCDMA, etc.).

Embodiments of the present disclosure may be achieved by various means, for example, hardware, firmware, software, or a combination thereof.

In a hardware configuration, the methods according to exemplary embodiments of the present disclosure may be achieved by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, microcontrollers, microprocessors, etc.

In a firmware or software configuration, the methods according to the embodiments of the present disclosure may be implemented in the form of a module, a procedure, a function, etc. performing the above-described functions or operations. A software code may be stored in the memory [3280 or 3290] *14 or 24* and executed by the processor [3220 or 3230] *13 or 23*. The memory is located at the interior or exterior of the processor and may transmit and receive data to and from the processor via various known means.

Those skilled in the art will appreciate that the present disclosure may be carried out in other specific ways than those set forth herein without departing from the spirit and essential characteristics of the present disclosure. The above embodiments are therefore to be construed in all aspects as illustrative and not restrictive. The scope of the disclosure should be determined by the appended claims and their legal equivalents, not by the above description, and all changes coming within the meaning and equivalency range of the appended claims are intended to be embraced therein. It is obvious to those skilled in the art that claims that are not explicitly cited in each other in the appended claims may be presented in combination as an embodiment of the present disclosure or included as a new claim by a subsequent amendment after the application is filed.

INDUSTRIAL APPLICABILITY

The present disclosure is applicable to various wireless access systems including a 3GPP system, a 3GPP2 system, and/or an IEEE 802.xx system. Besides these wireless access systems, the embodiments of the present disclosure are applicable to all technical fields in which the wireless access systems find their applications.

What is claimed is:

1. A method of [selecting an uplink transmission resource, which is selected] *transmitting a signal* by a [user equipment (UE) in a wireless access system] *device* supporting [an unlicensed band] *a sidelink communication*, the method comprising:

receiving, from [an evolved NodeB (eNB)] *a base station (BS)*, [first information related to a resource selection area and second information on a reservation resource configuration for the unlicensed band] *configuration information including information regarding a resource pool, information regarding a device autonomous resource selection configuration for the resource pool, and a parameter for determining a signal transmission power value of the device*;

[selecting an uplink transmission] *performing a* resource [among resources of the unlicensed band in a time interval] *selection for multiple sidelink data transmissions*, based on the resource [selection area] *pool*; and

[transmitting a signal via] *based on channel sensing for multiple resources selection from the performed resource selection, performing the multiple sidelink data transmissions with the signal transmission power value determined based on* the [selected uplink transmission resource] *parameter*,

*wherein the multiple resources for the multiple sidelink data transmissions are selected by the device based on a time interval for the resource selection,* wherein the time interval for the resource selection [area] is determined based on a [reservation] resource *reservation* period (RRP), wherein the RRP is determined based on the [reservation resource configuration, and used for an eNB-scheduling based signal transmission] *configuration information received from the BS*, [and]

wherein, *for the multiple sidelink data transmissions,* the [uplink transmission resource is selected from the resource selection area without receiving an uplink grant from the eNB] *resource selection of the multiple resources is performed autonomously by the device based on the resource pool,*

*wherein the multiple resources selected for the multiple sidelink data transmissions are apart from each other in a time domain, and*

*wherein a range of a random backoff counter configured in the device for the channel sensing is wider than a range of a random backoff counter configured in the BS.*

2. The method of claim 1, wherein the time interval for the resource selection [area] is a prescribed time interval within the RRP.

3. The method of claim 1, wherein the time interval for the resource selection [area] is a prescribed time interval other than the RRP.

4. The method of claim 3, wherein the time interval for the resource selection [area] starts at t+a and ends at t+b, wherein a and b are predetermined values configured by a value equal to or greater than 0, and wherein t is a timing that the RRP ends.

5. The method of claim [3] *1*, wherein the [signal is transmitted according to] *configuration information further includes information regarding a sidelink* synchronization [obtained from the eNB] *reference*.

[6. The method of claim 3, wherein the signal is transmitted based on a parameter transmitted from the eNB.]

[7. The method of claim 3, further comprising:

performing carrier sensing on the resource selection area; and when a specific resource is in an idle state in the resource selection area, selecting the specific resource as the uplink transmission resource.]

[8. The method of claim 7, further comprising:

repeating the carrier sensing for selecting the specific resource as many as a first backoff counter, wherein when the idle state is repeated as many as the first backoff counter, the specific resource is determined as being in the idle state.]

[9. The method of claim 8, wherein the specific resource is configured based on carrier sensing of the eNB.]

[10. The method of claim 9, wherein the carrier sensing of the eNB for the specific resource is repeated as many as a second backoff counter, and wherein the second backoff counter has a value smaller than a value of the first backoff counter.]

11. A User Equipment (UE) [selecting an uplink transmission resource in a wireless access system] supporting [an unlicensed band] *a sidelink communication*, the UE comprising:

[a transmitter;

a receiver] *a transceiver*; and a processor coupled to the [transmitter and the receiver] *transceiver*, the processor configured to:

control the [receiver] *transceiver* to receive, from [an evolved NodeB (eNB)] *a base station (BS)*, [first information related to a resource section area and second information on a reservation resource configuration for the unlicensed band] *configuration information including information regarding a resource pool, information regarding a UE autonomous resource selection configuration for the resource pool, and a parameter for determining a signal transmission power value of the UE*;

[select an uplink transmission] *perform a* resource selection [among resources of the unlicensed band in a time interval] *for multiple sidelink data transmissions*, based on the resource [selection area] *pool*; and

*based on a channel sensing for multiple resources selected from the performed resource selection,* control the [transmitter] *transceiver* to [transmit a signal via the selected uplink transmission resource] *perform the multiple sidelink data transmissions with the signal transmission power value determined based on the parameter*,

*wherein the multiple resources for the multiple sidelink data transmissions are selected by the UE based on a time interval for the resource selection,* wherein the time interval for the resource selection [area] is determined based on a [reservation] resource *reservation* period (RRP), wherein the RRP is determined based on the [reservation resource configuration, and used for an eNB-scheduling based signal transmission] *configuration information received from the BS*, [and]

wherein, *for the multiple sidelink data transmissions,* the [uplink transmission resource is selected from the resource selection area without receiving an uplink grant from the eNB] *resource selection of the multiple resources is performed autonomously by the UE based on the resource pool,*

*wherein the multiple resources selected for the multiple sidelink data transmissions are apart from each other in a time domain, and*

*wherein a range of a random backoff counter configured in the UE for the channel sensing is wider than a range of a random backoff counter configured in the BS.*

*12. The method of claim 1, wherein the UE performs the channel sensing for the resource selection, based on that the time interval for the resource selection is within the RRP.*

*13. The method of claim 12, wherein performing the resource selection comprises:*

*selecting each resource not exceeding a sensing threshold configured in the device through the configuration information as a result of the channel sensing.*

*14. The method of claim 12, wherein the time interval for the resource selection relates to a specific subframe, a specific slot, or a specific sub-slot in the RRP.*

*15. A non-transitory medium that is readable by a processor and storing instructions that cause the processor to:*

*receive, from a base station (BS), configuration information including information regarding a resource pool, information regarding an autonomous resource selection configuration for the resource pool, and a parameter for determining a signal transmission power value of a device;*

*perform a resource selection for multiple sidelink data transmissions, based on the resource pool; and*

*based on channel sensing for multiple resources selected from the performed resource selection, perform the multiple sidelink data transmissions with the signal transmission power value determined based on the parameter,*

*wherein the multiple resources for the multiple sidelink data transmissions are selected by the processor based on a time interval for the resource selection,*

*wherein the time interval for the resource selection is determined based on a resource reservation period (RRP),*

*wherein the RRP is determined based on the configuration information received from the BS,*

*wherein, for the multiple sidelink data transmissions, the resource selection of the multiple resources is performed autonomously by the processor based on the resource pool,*

*wherein the multiple resources selected for the multiple sidelink data transmissions are apart from each other in a time domain, and*

*wherein a range of a random backoff counter configured in the device for the channel sensing is wider than a range of a random backoff counter configured in the BS.*

*16. A device supporting a sidelink communication, the device comprising:*

*a memory to store instructions; and*

*a processor to perform operations by executing the instructions,*

*wherein the operations comprise:*

*receiving, from a base station (BS), configuration information including information regarding a resource pool, information regarding a device autonomous resource selection configuration for the resource pool, and a parameter for determining a signal transmission power value of the device;*

*performing a resource selection for multiple sidelink data transmissions, based on the resource pool; and*

*based on channel sensing for multiple resources selected from the performed resource selection, performing the multiple sidelink data transmissions with the signal transmission power value determined based on the parameter,*

*wherein the multiple resources for the multiple sidelink data transmissions are selected by the device based on a time interval for the resource selection,*

*wherein the time interval for the resource selection is determined based on a resource reservation period (RRP),*

*wherein the RRP is determined based on the configuration information received from the BS,*

*wherein, for the multiple sidelink data transmissions, the resource selection of the multiple resources is performed autonomously by the processor based on the resource pool,*

*wherein the multiple resources selected for the multiple sidelink data transmissions are apart from each other in a time domain, and*

*wherein a range of a random backoff counter configured in the device for the channel sensing is wider than a range of a random backoff counter configured in the BS.*

* * * * *